(12) United States Patent
Fassbender et al.

(10) Patent No.: US 8,807,655 B2
(45) Date of Patent: Aug. 19, 2014

(54) FIXTURE ARRANGEMENT FOR A SEAT, IN PARTICULAR A VEHICLE SEAT, AND METHOD FOR MOUNTING SUCH A FIXTURE ARRANGEMENT

(75) Inventors: Frank Fassbender, Coburg (DE); Oliver Steffen, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 627 days.

(21) Appl. No.: 12/993,082

(22) PCT Filed: May 18, 2009

(86) PCT No.: PCT/EP2009/056005
§ 371 (c)(1),
(2), (4) Date: Dec. 8, 2010

(87) PCT Pub. No.: WO2009/138514
PCT Pub. Date: Nov. 19, 2009

(65) Prior Publication Data
US 2011/0101756 A1 May 5, 2011

(30) Foreign Application Priority Data

May 16, 2008 (DE) .......................... 10 2008 024 056
Sep. 12, 2008 (DE) .......................... 10 2008 047 660
Dec. 10, 2008 (DE) .......................... 10 2008 061 691

(51) Int. Cl.
*B60N 2/02* (2006.01)
(52) U.S. Cl.
USPC ........................................ 297/463.1; 29/428
(58) Field of Classification Search
USPC ................... 297/362, 361.1; 29/428
See application file for complete search history.

(56) References Cited

U.S. PATENT DOCUMENTS

| 5,586,833 A | 12/1996 | Vossmann et al. |
| 6,095,608 A * | 8/2000 | Ganot et al. ............... 297/367 R |
| 6,454,354 B1 | 9/2002 | Vossmann et al. |

(Continued)

FOREIGN PATENT DOCUMENTS

| DE | 33 25 045 A1 | 1/1985 |
| DE | 43 40 696 C1 | 6/1995 |

(Continued)

OTHER PUBLICATIONS

International Search Report, dated Mar. 18, 2010, corresponding to PCT/EP2009/056005, 8 pages.

*Primary Examiner* — Milton Nelson, Jr.
(74) *Attorney, Agent, or Firm* — Christie, Parker & Hale, LLP

(57) ABSTRACT

A fixture arrangement for a seat, in particular for a vehicle seat, is provided. The fixture arrangement includes a first and a second fixture each of which comprises a first and a second driving element, each of which has a cavity with an internal contour, and a shaft connecting the two fixtures and an adjusting element for operating the fixtures. The shaft has a first end with an external contour to be positively inserted into the first driving element and a second, in particular cylindrical end. In an intermediate mounted position the second driving element, the second end of the shaft and the adjusting element can be positioned in any rotational position. In a final mounted position the two driving elements, the shaft and the adjusting element, are connected with each other in a rotationally fixed manner by, for example, a bush.

14 Claims, 11 Drawing Sheets

(56) References Cited

U.S. PATENT DOCUMENTS

| | | |
|---|---|---|
| 6,543,849 B1 | 4/2003 | Yamada |
| 7,201,447 B2 * | 4/2007 | Yamada ............ 297/367 R |
| 2006/0181130 A1 | 8/2006 | Kienke et al. |
| 2008/0093906 A1 | 4/2008 | Gruson |
| 2009/0021062 A1 | 1/2009 | Lehmann |
| 2009/0230746 A1 | 9/2009 | Ng et al. |

FOREIGN PATENT DOCUMENTS

| | | |
|---|---|---|
| DE | 299 22 702 U1 | 8/2000 |
| DE | 199 11 281 A1 | 9/2000 |
| DE | 10 2006 009 715 A1 | 9/2006 |
| DE | 100 53 414 B4 | 9/2006 |
| DE | 20 2005 009 869 U1 | 11/2006 |
| DE | 10 2006 030 239 B3 | 12/2007 |
| DE | 10 2006 041 917 B3 | 1/2008 |
| DE | 10 2007 051 842 A1 | 5/2008 |
| EP | 1 066 170 B2 | 1/2001 |
| WO | WO 2004/082981 A1 | 9/2004 |
| WO | WO 2006/105657 A1 | 10/2006 |

* cited by examiner

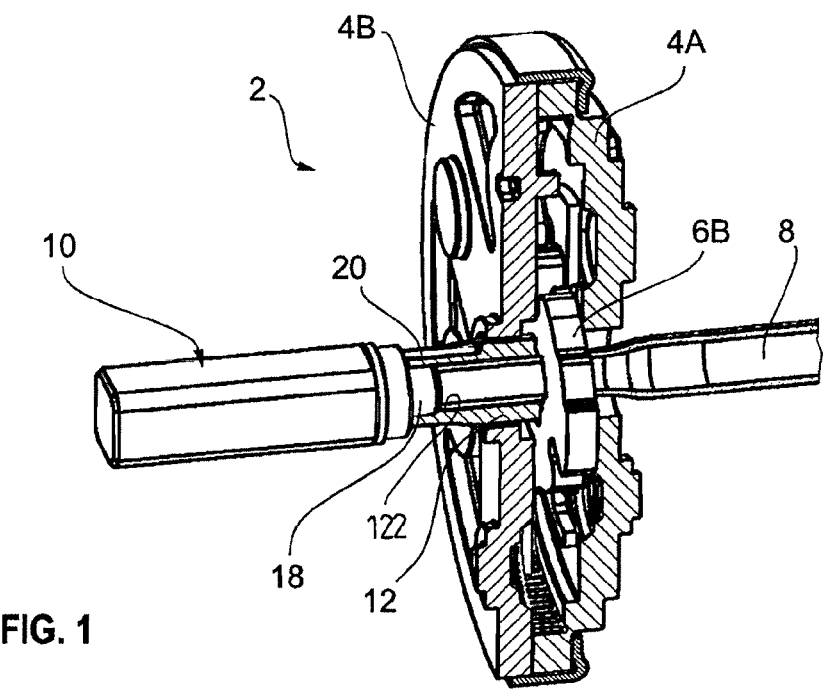
FIG. 1
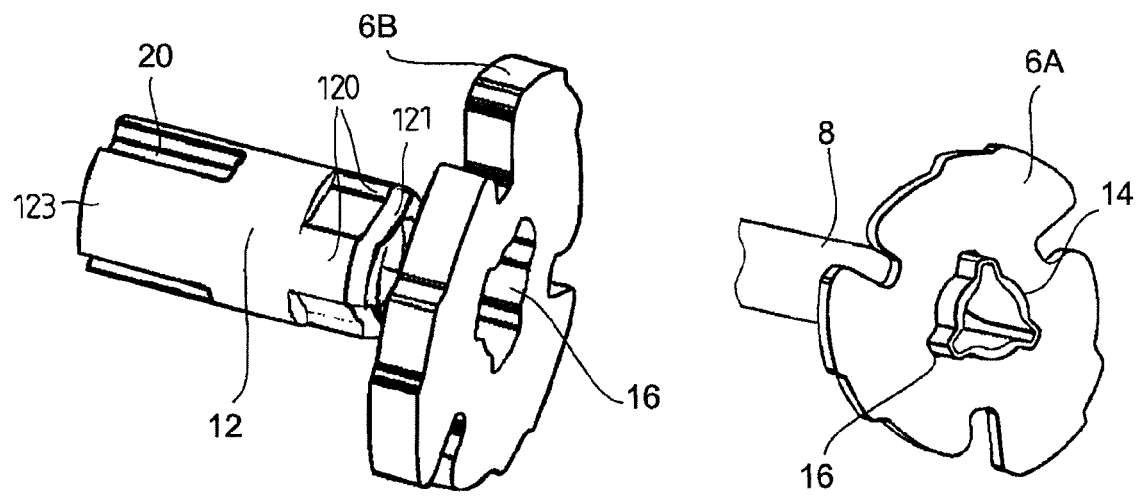
FIG. 2
FIG. 3
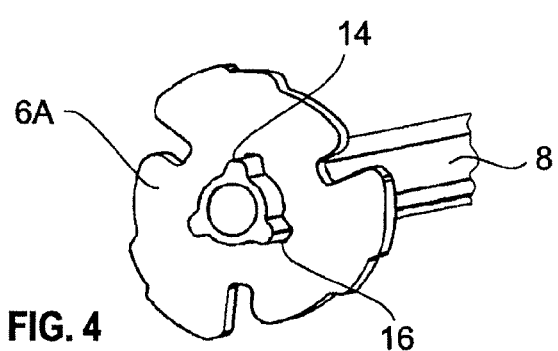
FIG. 4

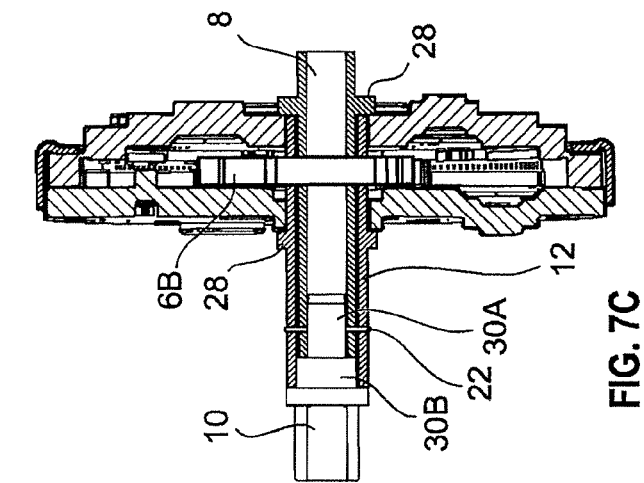
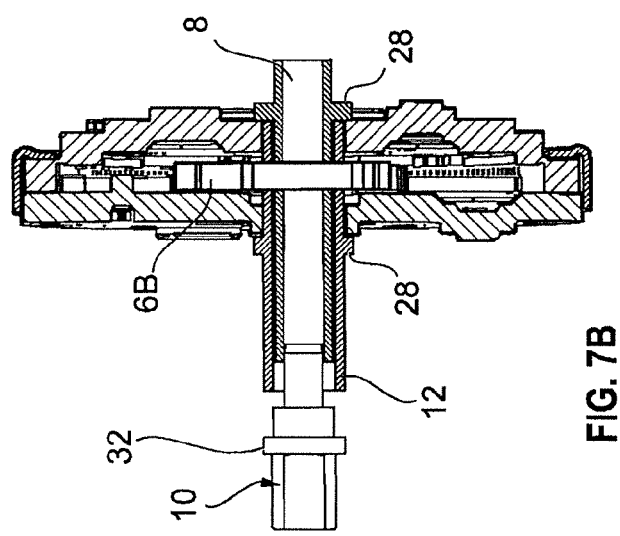
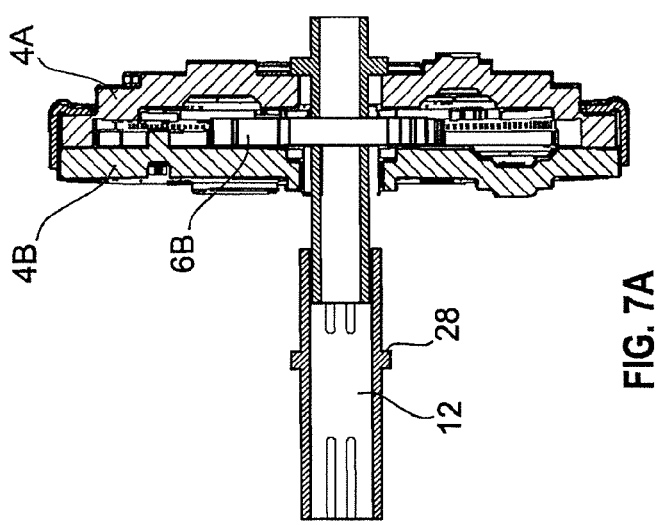
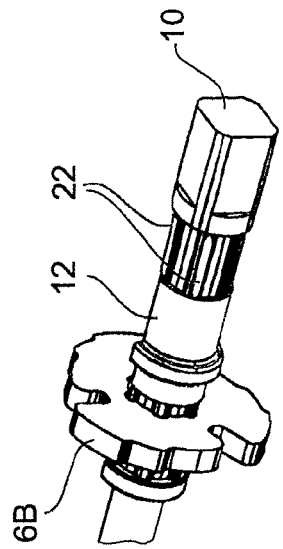
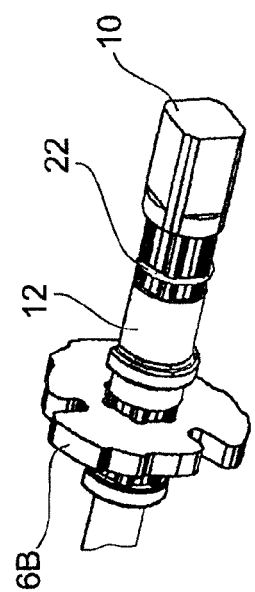

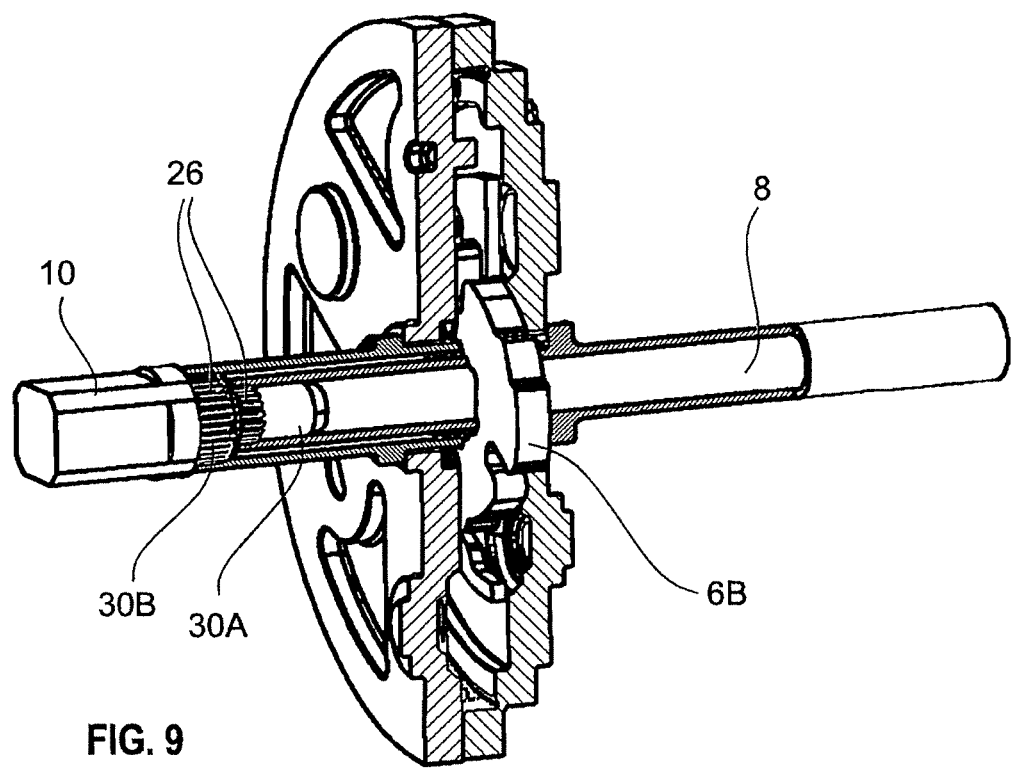
FIG. 9
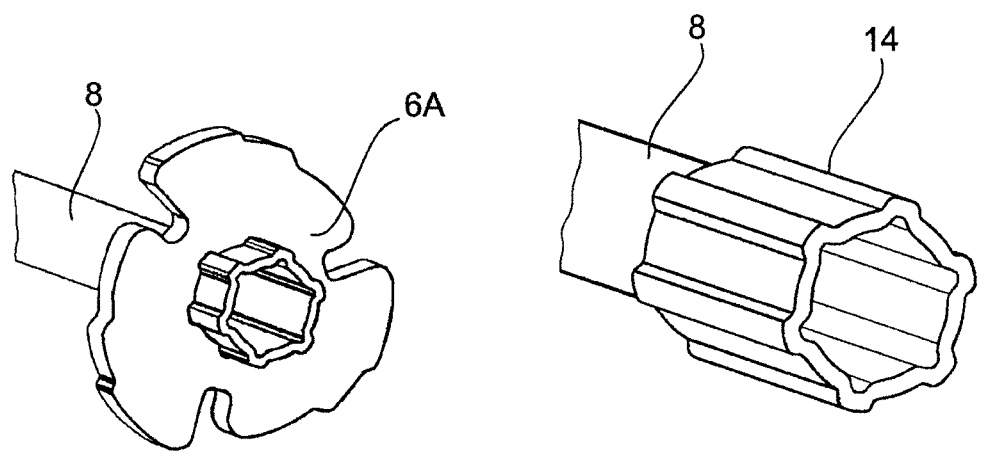
FIG.10A
FIG.10B

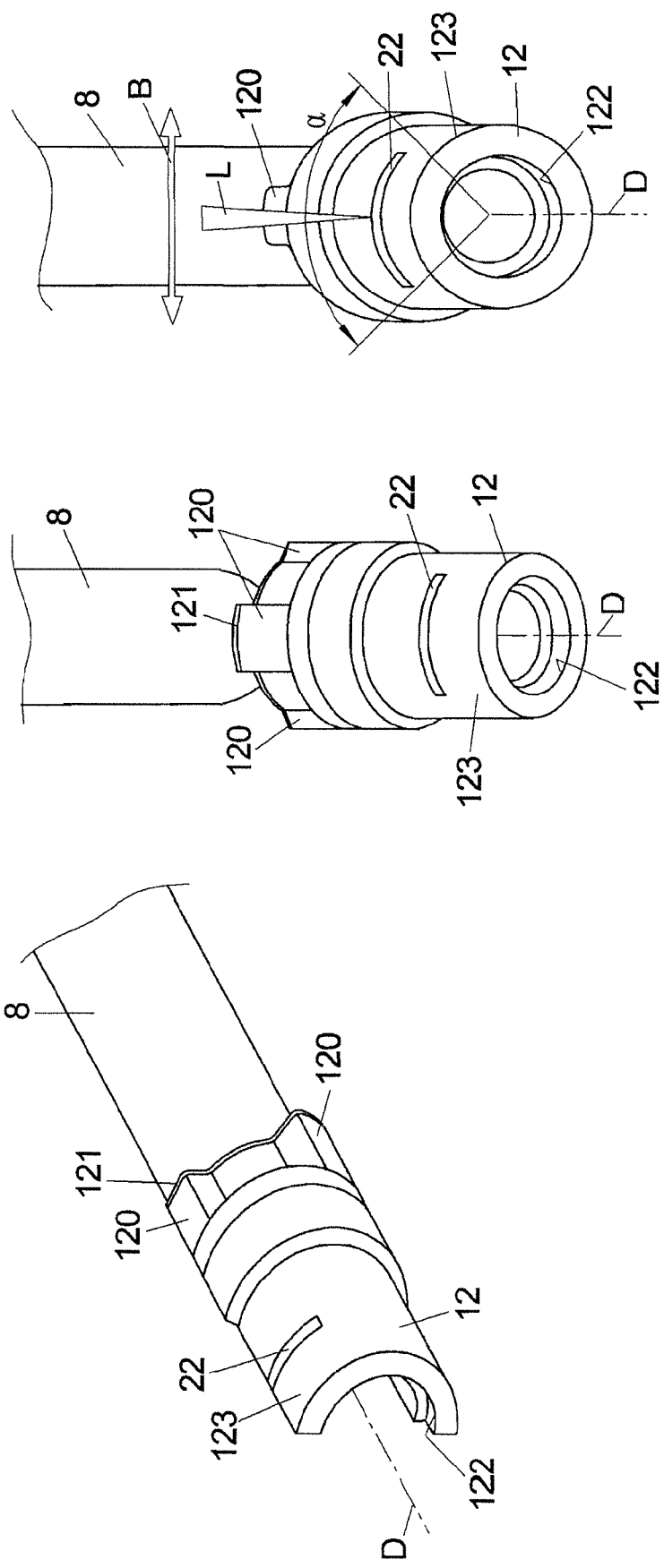

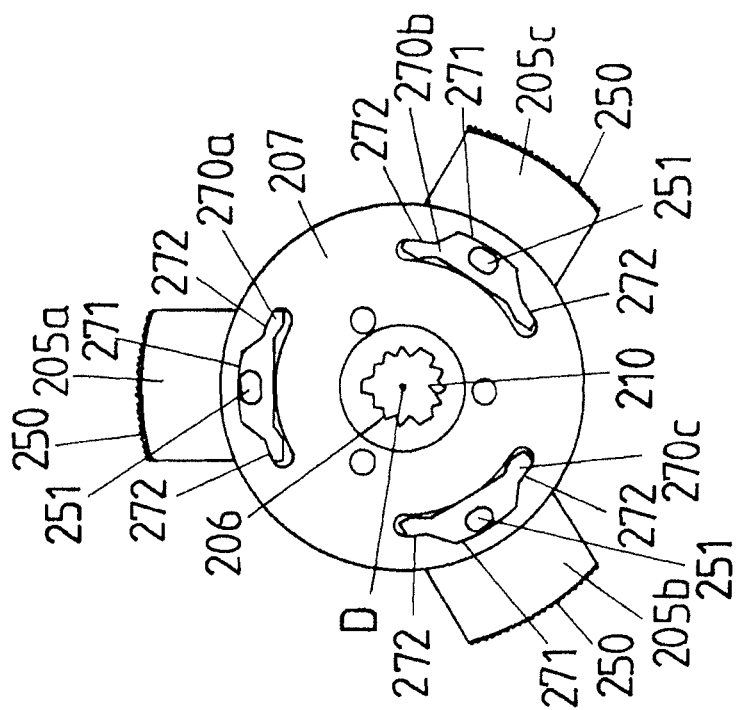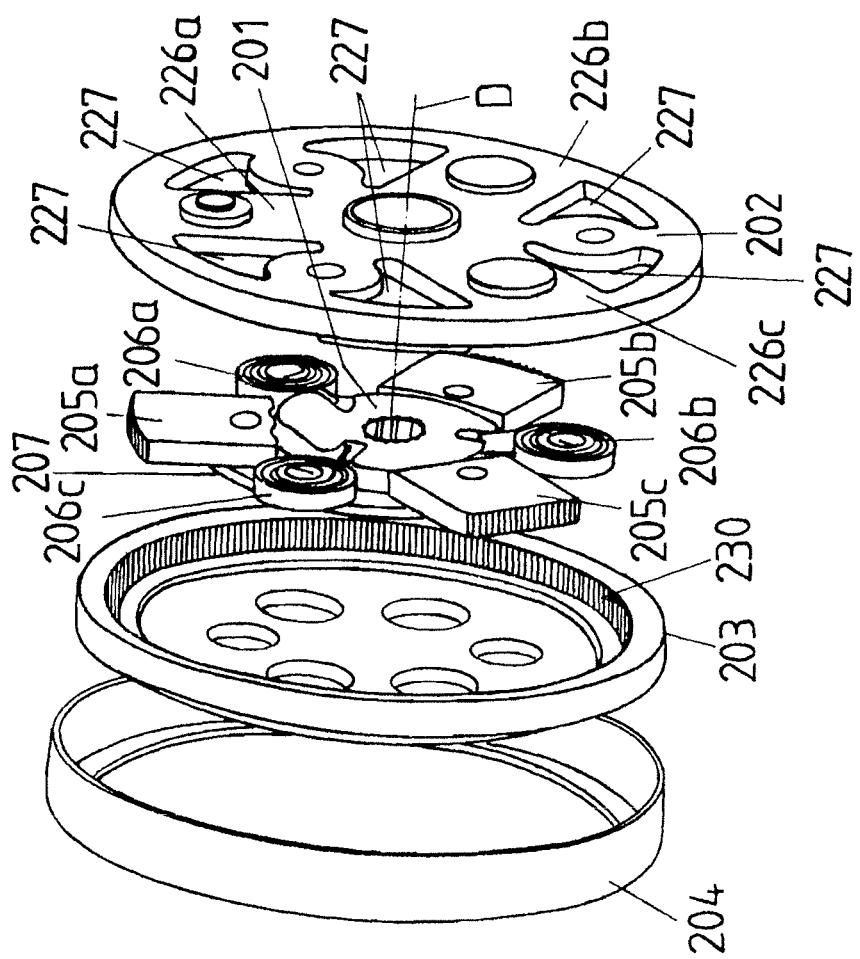

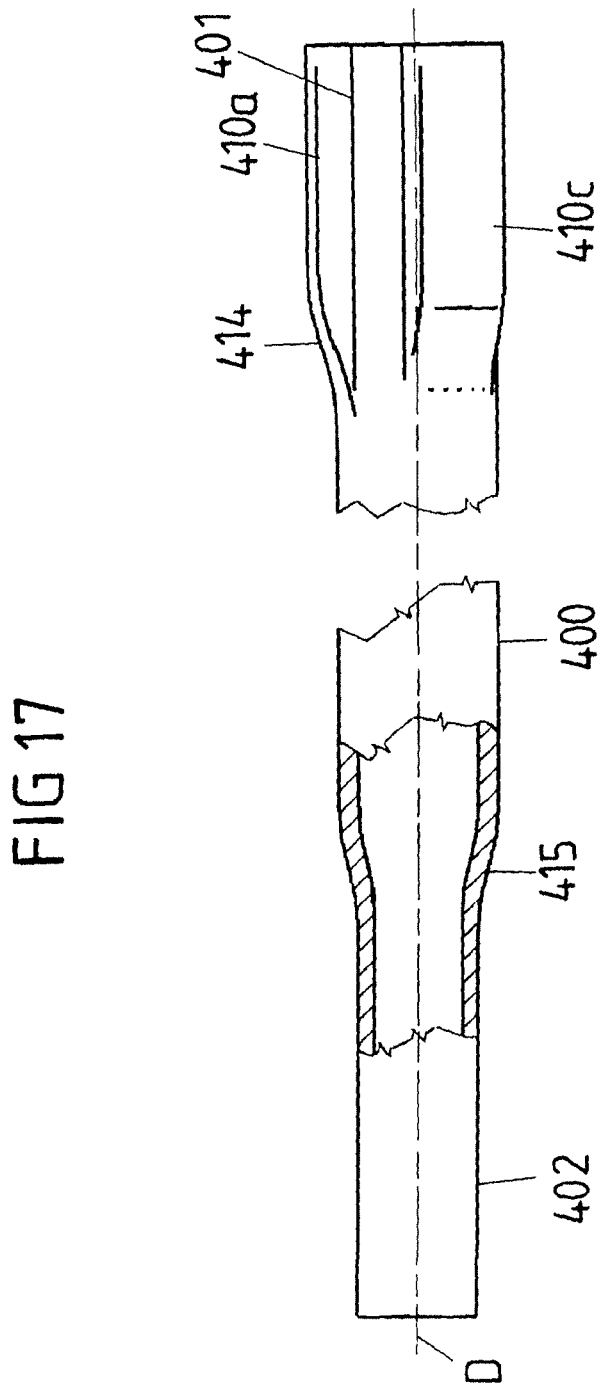

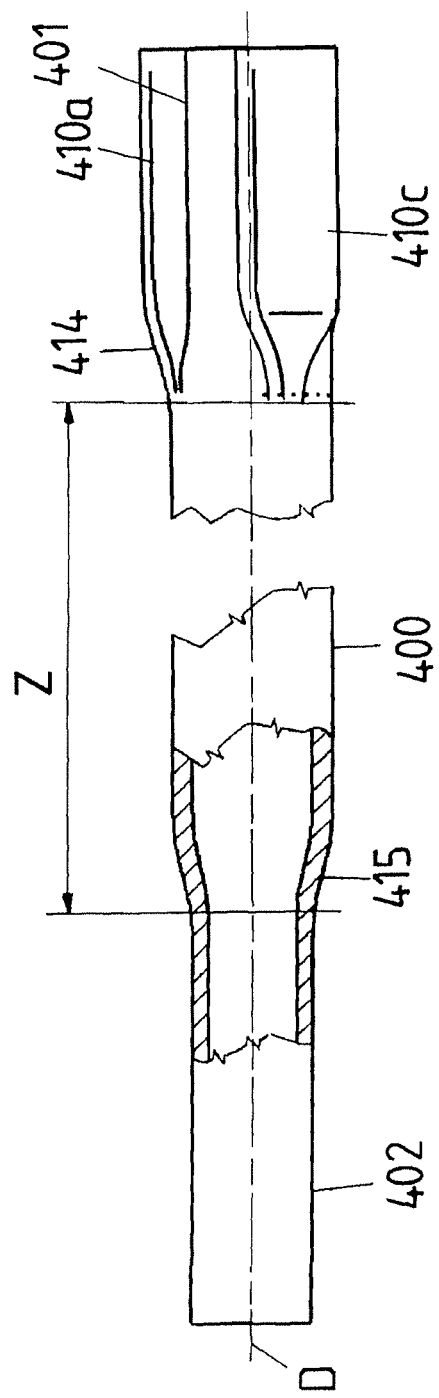

FIXTURE ARRANGEMENT FOR A SEAT, IN PARTICULAR A VEHICLE SEAT, AND METHOD FOR MOUNTING SUCH A FIXTURE ARRANGEMENT

CROSS-REFERENCE TO A RELATED APPLICATION

This application is a National Phase Patent Application of International Patent Application Number PCT/EP2009/056005, filed on May 18, 2009, which claims priority of German Patent Application Number 10 2008 024 056.7, filed on May 16, 2008, of German Patent Application Number 10 2008 047 660.9, filed on Sep. 12, 2008 and of German Patent Application Number 10 2008 061 691.5 filed on Dec. 10, 2008.

BACKGROUND

The invention relates to a fixture arrangement for a seat, in particular for a vehicle seat and a method for mounting a fixture arrangement.

A fixture arrangement for a seat, in particular for a vehicle seat comprises usually two fixtures being in each case arranged laterally on the seat and via which in each case a seat element is connected with a backrest element such that an adjustable inclination of the backrest element is possible. If the fixtures are formed as so called locking fixtures, then the fixtures have to be brought for an adjustable inclination from a locking or snapping position into a release position.

The locking fixtures comprise usually two fixture parts, which on the one hand are mechanically fixed to the backrest element and on the other hand to the seat element and are pivoted against each other. For interlocking in the locking position usually locking elements are provided. These are for instance movably mounted in radial direction on the one fixture part and are moved against the second fixture part into a locking position. In the locking position toothings of the locking elements and the second fixture part interlock for instance with each other. For unlocking the locking elements are withdrawn in radial direction so that the toothings are being disengaged and a rotational movement of the two fixture parts towards each other and therefore an adjustable inclination is possible. This unlocking is for instance effected by an actuator lever arranged laterally on the seat. Such a locking fixture is for instance described in EP 1 066 170 B2.

For operating the adjustable locking elements usually a driving element is provided, which for instance comprises a cam disc with eccentrically arranged cams and is arranged torque-proofed on a shaft. The shaft is being rotated by the actuator lever. Due to the eccentric arrangement of the cams an operating of the locker occurs into or out of its locking position.

The actuator lever is arranged in a motor vehicle generally outside of the side of the door. On the opposite side orientated to the respective neighbouring seat (driver seat or co-driver seat), the so called tunnel side, is therefore only a fixture without actuator lever arranged. In summary, four different fixtures are required therefore in a motor vehicle, leading to a relative large effort in storage and supply during mounting.

Due to safety related considerations it has to be guaranteed in case of a motor vehicle seat that the two locking fixtures are mounted mostly synchronic to each other, e.g. that they are arranged in case of a defined position of the shaft in an identical locking or releasing position. Simultaneously, however, also the actuator lever should be oriented due to comfort and design considerations in a defined angle position. Due to these requirements the mounting of such a fixture arrangement is connected in comparison with a large effort.

In case of a fixture arrangement with two fixtures known from DE 10 2006 009 715 A1 driving elements of the fixture are connected with each other via a shaft and a bush is positively inserted into a driving element in form of a cam.

A fixture arrangement is known from DE 10 2007 051 842 A1 in case of which similar to the one from DE 10 2006 009 715 A1 a bush in form of a muffle arranged on a shaft is positively inserted into a driving element.

In case of a fixture arrangement known from WO 2004/082981 A1 two ends of a shaft are connected via identical form profile parts by machining pressing-in to a respective driving element of a shaft in order to bring the shaft in a first step into the desired rotational position in respect to the driving elements and only to connect them in a second step to the driving elements torque-proofed.

In case of a fixture arrangement known from WO 2006/105657 A1 a shaft engages positively with driving elements of two fixtures.

SUMMARY

The object of the invention is to simplify the effort for the mounting of such a fixture arrangement while complying with the requirements.

The fixture arrangement comprises a first and a second fixture, in particular locking fixtures, which comprise in each case a first driving element on the tunnel side and a second driving element on the door side. The driving elements are hereby preferably formed as cam discs with excentric cams or comprise at least one such cam disc. The driving elements serve in general the adjusting of a locking element of the locking fixture. The driving elements comprise in each case a cavity with a internal contour. Furthermore, the fixture arrangement comprises a shaft connection the two fixtures, which is in particular formed as a hollow shaft and an adjusting element, which serves for operating (unlocking) of the fixtures. The shaft comprises a first end on the tunnel side with an external contour for a positive insertion into the first driving element on the tunnel side and on the door side. This is essentially formed cylindrically. Of particular importance is thereby that the shaft is positively inserted with its tunnel sided end and therefore torque-proofed inserted into the first driving element. Simultaneously, the shaft with its second cylindrical end is at first not yet torque-proofed connected to the second driving element. The door side end deviates from the tunnel side end by not being formed for a positive insertion into the driving element that means it does not comprise an external contour adapted to the internal contour. This specific embodiment enables that in a intermediate mounted position the door sided driving element, the door sided end of the shaft and the adjusting element can be at first positioned in any rotational position towards each other, that means can be rotated relatively to each other so that these three parts, in particular the adjusting element is oriented in the desired rotational position. Finally, means are provided for fixation of this desired and adjusted rotational position between the shaft, the door sided driving element and the adjusting element so that in a final mounted position the two driving elements, the shaft and the adjusting element are torque-proofed connected with each other. The rotational position of the shaft is thereby determined by the positive connection of the side of the first driving element.

The particular advantage of this arrangement is that the two fixtures, that means the tunnel sided but also the door sided fixture, can have an at least almost identical structure. During mounting only then it is being defined, for which seat and for which side of the respective seat the fixture is being used. Due to this identical part principle the storage and the disposition of the material flow until the final assembly is therefore clearly simplified.

Due to the free relative rotatability of the shaft in respect to the door sided driving element it is guaranteed that said driving element is not rotated out of its defined position. Through this, the two driving elements of the two fixtures remain during mounting in a defined, unified position. This defined position of the driving elements is for instance being determined during assembly of the fixtures and is preferably the locking position of the fixtures. Through this, a synchronization of the position of the driving elements and therefore the locking position of the locking fixtures is guaranteed in total.

Due to the free relative rotatability of the adjusting element also said element can be brought into the desired rotational position, before it is tightly connected with the shaft and the driving element.

In terms of the identical part principle the cavities of the driving elements, into which the shaft is being inserted with its differently formed ends, are identically formed according to a relevant embodiment, comprise therefore also identical internal contours. The driving elements are preferably in total or the cam discs are formed identically.

For the arrangement of the positive insertion connection on the tunnel side the internal contour of the driving element is designed in a preferred embodiment out of the round and in particular according to a polygon. Here, the polygon is in general known as an arrangement as known in case of so called polygonal socket screws. The cavity can comprise hereby a polygonal cross sectional area, for instance a triangular; a square or hexagonal cross sectional area. A polygonal arrangement is in particular an arrangement in which the cavity comprises starting from a preferably circular geometry on the circumferential side single discrete, for instance rectangular or trapezoidal pockets or protrusions.

According to a useful improvement, an axial safety for the shaft is provided on one of the two fixture sides, which prevents an axial slipping of the shaft. Said safety is preferably formed on the door side and in particular automatically by the torque-proofed connection between the shaft, the second driving element and the adjusting element. On the opposing tunnel side there is preferably no axial safety provided. In fact, the shaft is disposed in this position with its tunnel sided end with a certain clearance, e.g. loose, in the tunnel sided driving element. In so far, a floating bearing is formed for the shaft on the tunnel side and a fixed bearing is formed on the door side.

In a preferred embodiment the adjusting element is designed as an adapter bolt, which is in turn designed for the arrangement of an actuator lever. The manual operation occurs via the actuator lever by the hand of the user. The adapter bolt presents therefore a model or customer specific interface and defines the available connection for a respective model or customer specific actuator lever. The customer specific adaptation occurs only through the adapter bolt. This therefore allows inserting the identical fixtures in terms of the identical part principle irrespective of the different models. The adapter bolt is preferably a bolt-like element extending in axial direction, which is inserted with its one end into the second driving element and those second end projects from the fixture in axial direction and serves for mounting the actuator lever. Said actuator lever is for instance mounted torque-proofed on the adapter bolt, which is for this reason formed at its second end in form of a polygon.

As a means for fixation of the rotational position between the shaft, the driving element and the adjusting element, a positive press or press-in connection between at least two of these three parts is provided according to a preferred embodiment. The determination of the desired rotational position occurs therefore in a simple manner by a press-in process, in particular so that no further fixations are required. During the press-in process a desired plastic material deformation occurs thereby, for instance by torque-proofed elements projecting there from, like noses, toothings etc. Due to the press-in connection also an axial safety is achieved simultaneously by frictional contact. During the assembly it is preceded such that the singular parts are brought towards each other in the desired rotational position without them being already tightly connected. Subsequently, the parts are driven into each other in axial direction that means in longitudinal direction of the shaft and are therefore connected torque-proofed towards each other in the desired rotational position determined before hand. According to an useful embodiment it is therefore provided that at least one of the parts comprises in particular a circumferential knurling or toothing.

The means for fixation comprise a bush, which preferably rests positively in the cavity of the second driving element. The bush defines hereby in particular a mounting aid for the adjusting element and the shaft, which is connected torque-proofed to the second driving element in each case indirectly via the bush. Due to the bush an improved stability is achieved in total, since the adjusting element and/or the shaft are inserted into the bush. For this reason also an increased safety against so-called improper use forces is provided, when for instance a user misuses the activator lever as footsteps. In order to form the positive connection of the bush with the cavity of the driving element, the bush comprises on the end side thereof an external contour designed complimentary to the cavity, in particular a polygonal contour.

The bush is conveniently pressed into the cavity, e.g. the bush lays with a clearance in the cavity, so that said bush is also fixed in axial direction. During mounting it is preceded such that at first the bush is pressed into the cavity, subsequently the shaft and the adjusting element is brought into the desired rotational position and are finally connected to the bush torque-proofed. For this reason the shaft and/or the adjusting element can be connected to the bush by pressing in.

Alternatively or additionally for pressing in, a firmly bonded connection, in particular a welded connection is provided in a preferred variant for fixation of the rotational position. A rotational safety as well as an axial safety can be obtained via the welded connection. Depending on the arrangement the bush can hereby be connected to the driving element, the bush to the adjusting element, the bush to the shaft, the shaft to the adjusting element or also in a common welded joint the bush to the shaft and the adjusting element. In principle, there is also the possibility to weld the adjusting element and/or the shaft directly to the driving element. The welded joint occurs preferably exclusively on the door side easily accessible, mainly via the bush on the outside thereof.

In an useful arrangement the bush comprises preferably outside in multiple subsections material tapers so that welded pockets are formed. These welded pockets define desired welded positions and guarantee a secure welding. The welded pockets continue preferably in axial direction and are arranged evenly distributed on the lateral surface of the cover. Additionally or alternatively also circumferential welded joints can be provided.

Alternatively to the arrangement with the pressed-in bush, said bush is present in the cavity with clearance and therefore loose in axial direction, so that axial forces eventually appearing are not transferred onto the driving element.

According to a preferred arrangement, the bush and preferably also the shaft comprise in each case an outer stop via which the axial position is determined in respect to the second fixture. The shaft as well as the bush is supported in each case on a fixture part of the door side fixture by said outer stop, which can be for instance designed as a circumferential annular collar.

In order to achieve a high mechanical resistance force, in particular against misuse forces, the parts shaft, adjusting element and bush of the type according to a pipe-in-pipe-combination are inserted into each other. It is hereby in particular provided that for instance in the area of a welded seam all three elements are inserted into each other.

It is thereby usefully provided that the adjusting element comprises two pins with different diameters, which are attached to each other on the end side in axial direction. The front pin with a smaller diameter is thereby inserted into the shaft formed as a hollow shaft so that at best a clearance is provided during insertion. The back pin is on the other side formed with a larger diameter, which is adapted to the internal diameter of the bush at best with a clearance during insertion. Through this a specifically stable connection is obtained. Simultaneously, the back pin defines a stop for the shaft. The adjusting element comprises preferably an additional outer stop in particular formed as an annular collar, with which the adjusting element is supported on the front sided end of the bush.

Alternatively to this two-step pin arrangement the adjusting element and the shaft are inserted into the bush and align quasi with each other. The shaft as well as the inserted pin of the adjusting element is hereby immediately connected to the bush, preferably firmly bonded by welding.

According to a third embodiment, it is finally provided that the adjusting element comprises a longitudinal pin, which is inserted through the complete bush. On the end thereof the shaft is fixed, which therefore is connected only directly via the longitudinal shaft to the bush and to the driving element. The fixation of the shaft of the longitudinal pin can thereby occur either firmly bonded or by pressing on.

Accordingly, a fixture arrangement for a seat, in particular for a vehicle seat, comprises:
 a first fixture having a first driving element,
 a second fixture having a second driving element,
 a shaft connecting the first and the second fixture and extending along a rotational axis, which comprises a first end positively connected with the first driving element and a second end connected to the second driving element,
 an adjusting element for actuating the fixtures and
a bush connecting the second end of the shaft, the second driving element and the adjusting element with each other in a torque-proofed manner and comprises furthermore a firmly bonded connection.

The idea of said fixture arrangement is to provide the connection of the shaft connecting the fixtures to the driving element of the second fixture and the adjusting element via a bush, which for instance can be inserted positively in a cavity of the second driving element and at which at least one firmly bonded connection, for instance in form of a welded joint is arranged, via which a fixation of the connection of the shaft and the adjusting element to the second driving element occurs. The bush serves in particular as mounting aid for the adjusting element and the shaft, which are connected torque-proofed to the second driving element in each case directly via the bush. By means of the bush an improved stability and an increased safety against so-called misuse forces can be achieved in total, if for instance a user misuses the activator lever as a footstep.

The firmly bonded connection can be provided between the bush and the shaft and alternatively or additionally between the bush and the adjusting element. Thereby a common welded seam between shaft, adjusting element and bush can be used for obtaining the firmly bonded connection and for the torque-proofed fixation of the shaft and the adjusting element with the bush. It is also conceivable to use two separate welded seams for connecting on the one hand the bush with the shaft and on the other hand for connecting the bush with the adjusting element. Additionally, also one or multiple welded seams continuing in axial direction to the shaft can be provided on the bush.

An additional welded seam can also optionally be provided between the bush and the second driving element in order to connect the bush torque-proofed to the second driving element. Alternatively, the bush is inserted, in particular pressed positively in a cavity of the second driving element for connecting said bush to the second driving element. For forming the form locking of the bush with the cavity of the driving element, the bush comprises thereby on the side of the end an external contour, in particular a polygonal contour being designed complementary to the cavity. By pressing the bush into the cavity, the bush is disposed in the cavity with a clearance and is also fixated in axial direction relatively to the second driving element.

After pressing-in, the second end of the shaft and the adjusting element are inserted into a drilled hole of the bush, and the firmly bonded connection is provided for a torque-proofed fixation of the bush to the shaft and the adjusting element. During mounting it is thereby proceeded such that at first the bush is pressed into the cavity, subsequently the shaft and the adjusting element are brought into their desired rotational position and finally are connected torque-proofed to the bush.

In case of a firmly bonded connection formed as a welded joint, a welded seam is preferably arranged cross-wise to the rotational axis of the shaft on the bush. The welded seam extends therefore in circumferential direction around the bush, wherein the welded seam is for instance arranged on the circumference on a lateral surface of a cylindrical section of the bush.

By providing the circumferential welded seam directed cross-wise to the rotational axis of the shaft, the production of a firmly bonded connection can be simplified by a welding tool, in particular a welding laser. It can be in particular be abstained from welding pockets for production of a welded joint, whereby the production of the bush is simplified and a weakening of the bush by material thinning of the bush caused by the formation of the welded pockets can be avoided. Furthermore, the welded seam directed cross-wise can be arranged in any angular position on the circumference on the bush so that a precise alignment of the bush to the welding tool is not required.

A welded seam directed cross-wise to the rotational axis for production of the firmly bonded connection can further more be arranged such that it is easily accessible for a welding tool, in particular a welding laser, wherein the welding tool can be moved exclusively linear for production of the welded seam cross-wise to the rotational axis of the shaft, but does not has to be moved in axial direction.

The welded seam is preferably arranged in circumferential direction on a lateral surface of a cylindrical section of the bush and describes thereby a circumferential angle between 100° and 200°, in particular 130° to 170°. The welded seam surrounds the bush therefore not completely but scans only a circumferential subsection of the bush.

The welded joint occurs preferably exclusively on the easy accessible door-side, namely via the bush on the outside thereof.

Instead of a welded seam directed cross-wise also one or multiple welded seams can be provided alternatively in axial direction on the bush, wherein welded pockets can be provided for defining the welding position.

It is also conceivable to attach one or multiple welded seams with an inclination or a welded seam changing its direction in a kind of a zig-zag-form on the bush.

On the first end of the shaft extending along a rotational axis at least one projection projecting radial to the rotational axis from a first circumference of the shaft can advantageously be formed for obtaining a positive operative connection, which comprises two shoulders, which at least sectionally continue parallel to each other and which are operatively connected with the first driving element. With such a design of the at least one projection a preferred force transmission from the shaft to the driving element of the locking fixture shall be achieved. By departing from the existing cuneiform design of projections of a shaft hereby the projections are provided with two shoulders, which at least sectionally continue parallel to each other and are operatively connected for the force transmission to the driving element, e.g. the cavity of the driving element. Due to the parallel design of the shoulders, the wedge effect of the shaft in the cavity of the driving element during transfer of a rotational moment is reduced. The force transmission occurs essentially in circumferential direction.

The design of the at least one projection with two parallel shoulders provides a compromise between the most optimal force transmission and a simple production of the shaft. In order to achieve the transmission of a mere rotational moment the shoulders of the projections should be directed radial, e.g. lateral to the circumference of the shaft. Such a design of the projections would however hamper the production of the shaft. By designing the at least one projection with two parallel shoulders, the shaft is producible in a simple manner by inserting a shaped profile in a drilled hole extending longitudinal along the shaft and provides simultaneously an improved force transmission with a primarily transmission of a rotational moment.

The shaft is preferably operatively connected to the driving element of the first locking fixture in the area of the first end thereof. In the area of a second end the shaft can then be connected to a second locking fixture, which is to be mounted on a second side of the motor vehicle seat opposing the first side, wherein the first locking fixture and the second locking fixture comprise in each case a driving element for actuating designed for instance as cam disk and the shaft is connected on the second end thereof to the driving element of the second locking fixture. The shaft serves therefore for actuating the two locking fixtures, for instance for opening in order to lock and arrest a backrest of a motor vehicle seat in a specific inclination position, wherein due to the both-sided arrangement of the locking fixtures on two sides of the vehicle seat a both-sided arresting is achieved. The locking fixtures are released for actuating, so that the backrest can be adjusted and can be brought into a new, pivoted inclination position. The first and the second locking fixture can be thereby identically designed, in particular, with structurally identical driving elements in form of cam discs, so that the same parts can be used for both locking fixtures and therefore the mountability of the fixture arrangement is simplified.

In a preferred embodiment the shaft can comprise three projections projecting radially from the first circumference of the shaft outwardly, which form a carrier contour. These projections are for instance formed by cold forming of the shaft designed as a pipe, in which a shaped profile part is inserted into a drilled hole extending alongside of the shaft and the profile of the shaft is imprinted onto the shaped profile part by applying a pressure force and the projections are obtained such. The first circumference corresponds hereby to the actual circumference of the shaft formed for instance as a steel pipe. Since the projections project outwardly from said circumference and are not formed inwardly into the circumference, the force transmission occurs from the shaft onto the driving element at larger radius so that a preferred leverage with accordingly lower strain of the shaft and the projections thereof and a preferred force transmission is achieved.

During a rotational movement of the shaft into a first direction around the rotational axis a force transmission occurs from the shaft onto the driving element, in particular essentially via one of the shoulders and in case of a reverse rotational movement into the other direction, in particular via the other of the shoulders. Each shoulder of the at least one projection is therefore strained in one direction in case of force transmissions, wherein the one of the shoulders is arranged to one rotational movement and the other of the shoulders is arranged to the other rotational movement. The shaft can thereby being operatively connected to the cavity of the driving element such that a turning moment is transferred in circumferential direction of the shaft mainly exclusively via the shoulders onto the driving element. The operative connection in circumferential direction for transmitting a turning moment around the rotational axis is therefore essentially exclusively obtained via the shoulders. In case of transmitting a turning moment solely the shoulders are operatively connected to the cavity of the driving element and transfer the turning moment from the shaft onto the driving element.

Therefore, preferably solely the shoulders of the at least one projection are operatively connected to the cavity for the preferred force transmission in circumferential direction. The shaft can be radially operatively connected with sections of the first circumference, which correspond to circular segments of a circle with an inner radius around the rotational axis of the shaft, to the cavity of the driving element. The idea hereby is to provide the operative connection between the cavity and the shaft in circumferential direction via the shoulders of the at least one projection, by obtaining however the radial operative connection via other sections of the circumference being different from the shoulders of the projection. The radial operative connection serves thereby the radial arresting of the shaft in the cavity of the driving element and for centering the shaft in the cavity. This centering occurs via the sections of the first circumference being different from the shoulders of the at least one projection, which are in a radial contact to the corresponding sections of the cavity of the driving element. Forces directed radially to the rotational axis of the shaft are then transmitted essentially via the sections of the first circumference from the shaft onto the driving element.

In order to mount the shaft with the two locking fixtures the shaft is at first guided through the cavity of the driving element of the first locking fixture, is moved through the cavity and is inserted into the cavity of the driving element of the second locking fixture. The shaft can thereby comprise on a first end projections projecting radially outwardly from the first circumference of the shaft for connecting to the driving element of the first locking fixture, while the shaft is tapered in the area of the other, second end of the shaft compared to the first circumference. The shaft is such moved through the cavities of the driving elements of the first and the second locking fixtures until the projections of the shaft are operatively connected to the cavity of the driving element of the first locking fixture and the second tapered end of the shaft engages into the cavity of the driving element of the second locking fixture. The connection of the shaft to the driving element in the area of the second end occurs then for instance via an adapter bolt, which provides the connection of the shaft to an actuator element for actuating the fixture arrangement.

In a preferred embodiment the shaft comprises insertion slopes arranged in the direction of the rotational axis in a shifted manner for inserting the shaft into the cavities of the driving elements. The insertion slopes are preferably aligned to each other such that the insertion slopes comprise along the rotational axis of the shaft a different distance towards each other when the first locking fixture from the second locking fixture to be connected to the shaft.

The insertion slopes serve in particular to simplify the insertion of the shaft into the cavities of the locking fixture and to balance out during insertion manufacturing tolerances of the accuracy of fit of the shaft in the cavities of the driving elements of the locking fixtures. The insertion slope of the shaft is arranged towards each driving element. During insertion of the shaft into the cavities, the shaft is then in contact via its insertion slopes to the cavity of the driving element, and the shaft is in particular centred in the cavity of the second locking fixture in the area of the second end, which faces away from the first end of the shaft comprising the projections, such that the cavity continues completely or partially onto the corresponding insertion slop.

Due to the arrangement of the insertion slopes on the shaft with a distance being different from the distance of the locking fixtures along the rotational axis of the shaft it is guaranteed that the insertion slopes do not get in contact simultaneously, but one after the other to the cavities of the driving elements of the locking fixtures and the mounting force required for inserting the shaft is being reduced.

The advantages described in respect to the fixture arrangement and the preferred arrangements are also applicable to the method. In order to guarantee a defined synchronization between the two fixtures the fixtures are preferably in a defined locking position at the beginning of the assembly. In said locking position, the driving elements are in a defined rotational position, in which the locking elements are in the locking position, for instance in their radial outer position, so that a rotational movement of the two fixtures towards each other is suppressed. The locking fixtures are therefore delivered in this pre-mounted locking position and mounted on the seat.

In order to obtain the operative connection of the shaft in the area of a first end of the shaft, at least one projection projecting radially to the rotational axis from a first circumference of the shaft can be preferably provided for engaging into a cavity of the driving element of the first locking fixture. The at least one projection comprises two shoulders, which continue at least sectionally parallel to each other, wherein the shaft is inserted into the cavity of the driving element of the locking fixture for mounting such that the shoulders are operatively connected to the cavity of the driving element.

It is preferred to insert the shaft with the second end tapered in the diameter in comparison to the first end into a cavity of the driving element of the second locking fixture. The mounting of the shaft occurs thereby such that the shaft is at first inserted through the cavity in the driving element of the first locking fixture and subsequently inserted into the cavity of the driving element of the second locking fixture until the projections at the first end of the shaft are operatively connected to the cavity of the driving element of the first locking fixture. In order to insert the shaft in an easy manner insertion slopes shifted along the rotational axis can be provided on the shaft, which simplifies the insertion of the shaft through the cavities of the driving elements of the first and the second locking fixture.

The shaft can be preferably movable in an intermediate mounting position in direction of the rotational axis relative to the first locking fixture and can be rotated around the rotational axis relative to the second locking fixture. In the intermediate mounting position the shaft is therefore inserted to the cavities of the driving elements of the first and second locking fixtures, but is not yet finally fixated in respect to the cavities of the driving elements. In this manner the shaft in the intermediate mounting position can still be moved in respect to the cavity of the driving element of the first locking fixture and rotated in respect to the cavity of the driving element of the second locking fixture. In this manner it is possible to adapt the rotational position of the shaft to the second locking fixture and to adjust such that the shaft is positioned in the same twisted position of the driving element of the first locking fixture and of the driving element of the second locking fixture as this is required as an synchronic actuation of the locking fixture. In a final mounting position the shaft can then be connected firmly bonded or positively to the driving element of the second locking fixture so that the shaft is torque-proofed and firmly connected in axial direction to the driving element of the second locking fixture in the final mounting position. Due to the engagement of the projections into the cavity of the driving element of the first locking fixture, thereby only a fixation in the plane vertical to the rotational axis with the driving element of the first locking fixture is provided. An actual locking of the shaft relatively to the driving element does preferably not occur in order to avoid an over-determination. In this manner, a movement of the shaft relatively to the driving element of the first locking fixture is possible while operating the fixture arrangement so that tolerances can be compensated.

The shaft is inserted into the cavities of the driving elements of the first and the second locking fixture for mounting. A centering of the shaft in the cavity of the driving element of the first locking fixture occurs during mounting thereby preferably via sections of the first circumference of the shaft, which corresponds to circular segments of the circle with an internal radius around the rotational axis of the shaft and is being brought in radial operative connection to the cavity of the driving element of the first locking fixture. Due to the radial operative connection a centering of the shaft occurs relatively to the driving element of the first locking fixture, wherein the centering occurs preferably solely via these sections but not via the projections provided on the shaft. Through this, an over-determination during centering is avoided.

The shaft can comprise two insertion slopes, which correspond in each case to one of the driving elements of the first and the second locking fixture and are distant from each other along the rotational axis of the shaft such that when obtaining the connection of the shaft to the first and the second locking fixture, at first the one of the insertion slopes contacts the driving element of the one of the two locking fixtures and subsequently the other of the insertion slopes contacts the driving element of the other of the two locking fixtures.

The insertion slopes are aligned towards each other such that the distance between the insertion slopes along the rotational axis of the shaft differs from the distance of the two locking fixtures towards each other so that the insertion slopes contact one after the other the driving elements of the locking fixtures. In this manner, the mounting force required for inserting the shaft can be kept at a minimum.

The at least one projection at the first end of the shaft is preferably obtained by means of cold forming by inserting a shaped profile into a drilling hole extending along the rotational axis of the shaft. The shaping of the shaft with at least one projection comprising two parallel shoulders is a compromise, which allows on one hand a preferred force transmission from the shaft to the driving element and on the other hand a simple mounting by means of cold forming using a shaped profile. The shaped profile part is inserted for mounting into the drilling hole by applying a pressure force directed in the direction of the rotational axis and therefore the profile of the shaped profile part is imprinted onto the shaft.

BRIEF DESCRIPTION OF THE DRAWINGS

Embodiments of the invention are explained in the following by means of the figures.

FIG. 1 shows a partially sliced, perspective illustration of a door sided second locking fixture.

FIG. 2 shows a driving element designed as a cam disc and a bush for inserting into the cam disc into the door side locking fixture in a perspective explosion illustration.

FIG. 3 shows a perspective illustration of a cam disc with inserted shaft for the arrangement on the tunnel side.

FIG. 4 shows an illustration like in FIG. 3 with a shaft designed in a continuously cast profile.

FIG. 7A shows a partially cut illustration of the door sided locking fixture of a third embodiment in a first alternative in a first mounting step.

FIG. 7B shows a partially cut illustration of the door sided locking fixture of a third embodiment in a first alternative in a second mounting step.

FIG. 7C shows a partially cut illustration of the door sided locking fixture of a third embodiment in a first alternative in a third mounting step.

FIG. 8A shows a perspective sectional illustration of the part shaft, cam disc, bush and adjusting element of the third embodiment with different arranged welded joints.

FIG. 8B shows a perspective sectional illustration of the part shaft, cam disc, bush and adjusting element of the third embodiment with different arranged welded joints.

FIG. 9 shows a partially cut perspective illustration of the door sided locking fixture according to the third embodiment in a second alternative, in which the parts shaft, bush and adjusting element are connected torque-proof with each via a press-in connection.

FIG. 10A shows a perspective illustration of a cam disc with inserted shaft.

FIG. 10B shows a perspective illustration of a shaft.

FIG. 11 shows a perspective illustration of an embodiment of a bush on one end of the shaft.

FIG. 12A shows an illustration of the bush according to FIG. 11 diagonally from above.

FIG. 12B shows an illustration of the bush according to FIG. 11 diagonally from above.

FIG. 14A shows an explosive illustration of a locking fixture of a fixture arrangement.

FIG. 14B shows a view of parts of the locking fixture according to FIG. 2A.

FIG. 17 shows a sub-sectional view of an embodiment of a shaft.

FIG. 18 shows a sub-sectional view of a further embodiment of a shaft.

DETAILED DESCRIPTION

Figure 5C:
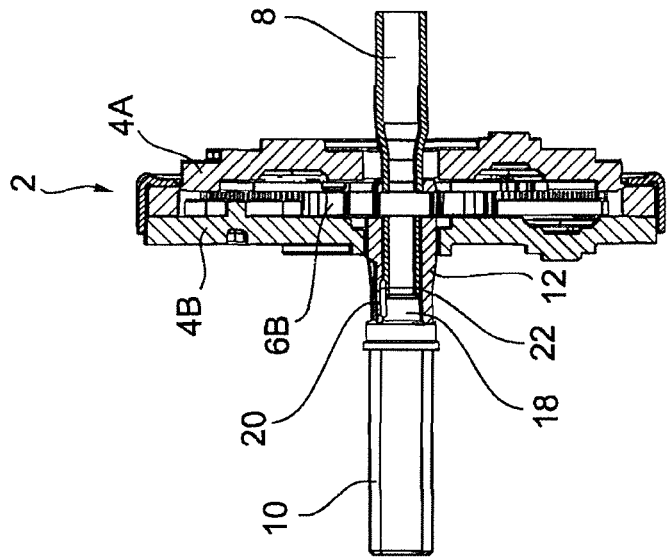
FIG. 5C shows a partially cut illustration of the locking fixture according to FIG. 1 in a third mounting step.

In the figures parts acting equally are, if useful, designated with the same reference sign.

The locking fixtures 2, shown in the figures, comprise in each case a first fixture part 4A and a second fixture part 4B. These are designed almost disc-like, respectively. Between said fixture parts an intermediate space is formed, in which a fixture mechanic is arranged. Said mechanic comprises in particular a driving element formed as a cam disc 6A, B. The reference sign 6A designates thereby the cam disc (first driving element) on the tunnel side and the reference sign 6B designates the door side cam disc (second driving element). The cam discs 6A, B are identically formed in the embodiment.

A locking element readily movable mounted on one of the two fixture parts 4A, B is actuated via the cam discs 6A, B and their cams arranged eccentrically thereon, in the example three cams, thus is moved in radial direction outwardly or is again pulled back. A locking between the two fixture parts 4A, 4B occurs via a locking element such that said parts cannot be twisted against each other. Thus, for instance an internal toothing is formed on the first fixture part 4A recognizable in FIG. 1 on a revolving edge, in which the locking elements engage with a corresponding external toothing in the locking position. The locking elements are hereby formed in the way of disc-like elements, on which front side the toothing is formed.

The cam discs 6A, B are rotated by means of an adjustment mechanism. This adjustment mechanism comprises a shaft 8 formed as a hollow shaft, an adjusting element formed as an adapter bolt 10 and a bush 12 described in the embodiments. In the final mounting position the three parts shaft 8, adapter bolt 10 and bush 12 are connected with each other and connected torque-proofed to the door side cam disc 6B.

The adapter bolt 10 serves for the fixation of an actuator lever (not shown) via which a manual actuating of a fixture arrangement occurs. By actuating this lever, the adapter bolt 10, with said bolt the shaft 8 and therefore the cam discs 6A, B are rotated so that the two locking fixtures are transferred synchronically from their locking position into a release position so that an inclination adjustment of the back rest is possible.

The door sided locking fixture 2 shown in FIG. 1 is fixed on the door side of a seat, in particular a motor vehicle seat, in a manner not described in detail here. On the opposite side, the tunnel side, a further locking fixture (not shown) is fixed. The two fixtures 2 are connected with each other via the shaft 8 and form a common fixture arrangement for the motor vehicle seat. The tunnel sided fixture comprises hereby the same parts and the same construction as the door sided locking fixture 2, with the exception that the bush 12 and the adapter bolt 10 are omitted.

This same part principle of the locking fixtures 2 is of essential importance and allows a use of identical parts independently on their respective mounting position of the respective locking fixture 2 (driver seat—co-driver seat; tunnel side—door side). Simultaneously, a customer or a model specific adaptation to a desired actuator lever is possible by the adapter bolt 10, without having to leave the same part principle.

While mounting it is proceeded such that the seat is pre-mounted with the two fixtures 2. Only afterwards the shaft 8 is guided through the two fixtures 2. Hereby said shaft is preferably moved from the tunnel side through the tunnel sided fixture 2 and is inserted into the opposite door sided fixture. Of special importance is that on the tunnel side the shaft 8 is connected torque-proofed with tunnel sided driving element 6A, while simultaneously on the door sided at first no specific rotational orientation of the shaft 8 in respect to the door side driving element 6B is determined. Through this it is guaranteed that during mounting one of the driving elements 6A, 6B is not rotated out of its defined position, in particular out of the defined locking position. This would lead in total to an asynchronic adjustment of the two fixtures 2, which is to be avoided due to comfort and safety technical aspects. Due to the at first free rotatability of the shaft 8 in respect to the door sided cam disc 6B can here through without any problems a different rotational orientation of the two fixtures 2, for instance due to mounting tolerances, be compensated.

During the mounting at first a rotational position between the shaft 8 and the tunnel sided cam disc 6A is determined in all embodiments on the tunnel side via a positive connection between the tunnel sided end of the shaft 8 and the tunnel sided cam disc 6A. This situation is shown in FIG. 3. In contrast, the rotational position of the shaft 8 in respect to the door sided cam disc 6B is initially open. For the positive connection of the tunnel sided end of the shaft 8 said end comprises a specific external contour 14. The shaft 8 with the tunnel sided end thereof is inserted into a cavity 16 of the cam disc 6A formed as a through-opening. The cavity 16 comprises an internal contour complementary to the external contour 14. The external contour 14 and the internal contour of the cavity 16 are in general designed for forming a positive connection effective in circumferential direction by insertion. The shaft 8 with the tunnel sided end thereof can be inserted into the cavity 16 with a light clearance.

In the embodiment of the FIGS. 2 to 4 the cavity 16 comprises an approximately circular basic geometry with pockets directed radially outwardly. Three such pockets shifted by the same angular amount are provided in the embodiment. The cavity 16 is therefore generally formed in the way of a polygonal cavity for instance known in case of screws for the transmission of turning moments.

The shaft 8 is designed as a cylindrical hollow shaft, for instance steel shaft, and is widened at the tunnel sided end thereof by a forming process in order to create the external contour 14 (FIG. 3). Alternatively, the shaft is being formed as a continuously casting profile. In this case the shaft 8 is brought on its door sided end by a forming process into an essentially cylindrical form.

In the embodiment of FIG. 1, the door sided end of the shaft 8 is conically tapered and inserted into an internal drilling hole 122 of the bush 12. The adapter bolt 10 coming from the other side is also inserted with an end side pin 18 into the drilling hole 122 of the bush 12. The pin 18 and the tapered door sided end of the shaft 8 align approximately with each other and rest to a large extend against the internal wall of the bush 12. In the embodiment of FIG. 1 the bush 12 is formed as a press-in bush with projections 120 projecting radially outwards. As emerging from FIG. 2, the projections 120 form an external contour adapted to the cavity 16 of the cam disc 6B, via which the bush 12 is torque-proofed disposed in the cavity 16. The bush 12 tapers somewhat on the front sided end thereof and forms such an insertion slope 121 in order to allow the pressing-in. Due to the pressing-in an axial fixation of the bush 12 in respect to the door sided cam disc 6B is obtained.

As further more emerges from FIG. 2, the bush 12 comprises at its end distant from the cam disc 6B and formed by a cylindrical section 123, multiple slots distributed on its circumference and formed as welded pockets 20, which are formed by a respective material thinning of the cylindrical wall of the cylindrical section 123 of the bush 12.

Figure 5B:
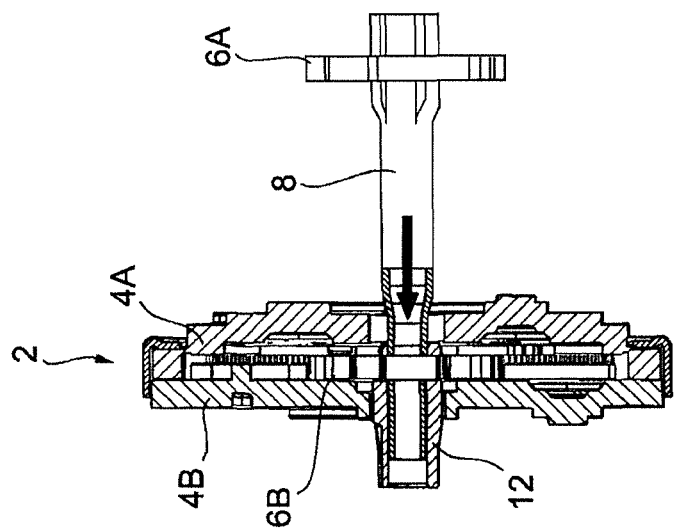
FIG. 5B shows a partially cut illustration of the locking fixture according to FIG. 1 in a second mounting step.
Figure 5A:
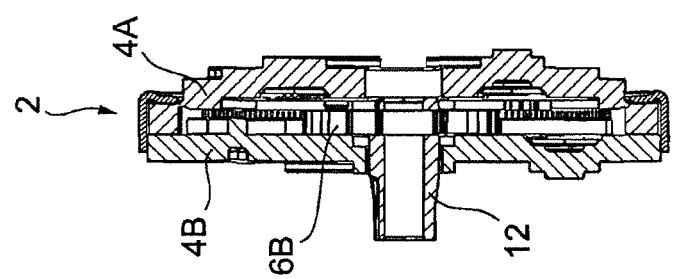
FIG. 5A shows a partially cut illustration of the locking fixture according to FIG. 1 in a first mounting step.

The mounting process becomes apparent by means of the FIGS. 5A to 5B: At first the bush 12 is pressed into the cavity 16 of the door sided cam disc 6B. The shaft 8 is inserted from the tunnel side, that means is guided with its cylindrical end ahead at first through the tunnel sided cam disc 6A. On the tunnel side, the tunnel sided end of the shaft 8 is positively inserted with the external contour thereof into the tunnel sided cam disc 6A (FIG. 5B). In FIG. 5B only the tunnel sided cam disc 6A of the tunnel sided locking fixture is shown. It is to be understood that the tunnel sided locking fixture is already been mounted and solely the shaft 8 is guided through the two locking fixtures 2 with the cam disc 6A, B. Due to the cylindrical design of the shaft 8 of the door side thereof, said shaft can be twisted in any desired manner in respect to the bush 12. Through this a twisting of the driving element 6B from its defined locking position is avoided during mounting. In the subsequent mounting step shown in FIG. 5C the adapter bolt 10 is inserted into the bush 12.

In this intermediate mounting position the rotational position of the adapter bolt 10 and the one of the shaft 8 in respect to the bush 12 and therefore to the cam disc 6B is in principle free. This is of specific importance for the synchronisation of the two fixtures via the shaft 8 as well as for the desired rotational position of the actuator lever to be mounted later via the adapter bolt 10. If the singular parts are oriented in the desired rotational position in this intermediate mounting position, they are connected to each other torque-proofed. In the embodiment of FIG. 5C this occurs via a schematically shown welded joint. The corresponding welded seam 22 is exemplarily shown in 5C. Said seam continues in longitudinal direction of the shaft 8 in the area of the welded pockets 20. As deducible from FIG. 5C, the welded seam 22 covers the pin 18 and a final piece of the shaft 8 such that with only one welded seam simultaneously the shaft 8 as well as the adapter bolt 10 are firmly bonded to the bush 12. Beside that further welded dots or also welded seams can be provided, for instance the adapter bolt 10 is additionally welded via a circumferential welded seam to the bush 12. It is thereby of its particular advantage if the welded seams 22 are found on the door side and due to the bush 12 are somewhat distant from the fixture part 4B and therefore very well accessible.

The mounting process can be described in detail as follows:

In a first mounting step the bush 12 is inserted with the projections 120 thereof into the cavity 16 of the cam disc 6B (see FIG. 5B).

In a second mounting step according to FIG. 5B the shaft 8 is at first guided with its tapered end through the cavity 16 of the cam disc 6A and is subsequently moved in mounting direction through the cavity 16 of the cam disc 6B until the tapered end engages into the drilling hole of the bush 12. In this intermediate mounting position the shaft 8 engages via projections into the cavity 16 of the cam disc 6A so that the shaft 8 is connected torque-proofed to the cam disc 6A. An axial movement in or opposite to the mounting direction of the shaft 8 in respect to the cam disc 6A of the tunnel sided locking fixture 2 remains further more possible. The tapered end of the shaft 8 engages thereby into the cavity 16 of the cam disc 6B of the door sided locking fixture 2, wherein a twisting of the shaft 8 in the drilling hole of the bush 12 is still possible in order to adapt the twisted position of the shaft 8 in respect to the cam disc 6B. This is provided in order to allow a twisting of the shaft 8 such that the shaft 8 is connected to the cam disc 6A, 6B in the same angular position and the synchronicity of the locking fixtures 2 is guaranteed while operating.

In a third mounting step according to FIG. 5C the adapter bolt 10 is inserted with the pin 18 into the drilling hole of the bush 12 and a firmly bonded connection is obtained via the welded pocket 20 so that the adapter bolt 10, the bush 12 and the shaft 8 are connected torque-proofed and firmly to the cam disc 6B of the door sided locking fixture 2. An additional fixation of the opposite end of the shaft 8 with the cam disc 6A of the tunnel sided locking fixture does not occur on the other side so that also in the final mounting position according to FIG. 5C at least a marginal excel movement of the shaft 8 relatively to the cam disc 6A is still possible and so that also while operating the fixture arrangement can compensate tolerances.

It is of an advantage in case of the described mounting method that all mounting steps can be conducted outside of the room between the locking fixtures 2. If the locking fixtures 2 are mounted on both sides of a vehicle seat, then it does not have to be grasped between the locking fixtures 2. The mounting can in fact occur from the outside by moving the shaft 8 through the locking fixtures 2 and subsequently fixating on the door sided locking fixture.

A modified embodiment of the bush 12 with a welded seam 22 arranged on said bush and directed in circumferential direction around the bush 12 is shown in FIGS. 11 and 12A, 12B. The bush 12 comprises how previously described, on its one end an external contour formed by projections 120, which are pressed-in to the cavity 16 of the cam disc 6B of the door sided locking fixture 2 forming the second driving element. On the face side an insertion slope 121 is formed on the bush 12, which shall simplify the insertion of the bush 12 with its projections 120 into the cavity 16 of the cam disc 6B. The bush 12 comprises on its other end a cylindrical section 123, on the lateral surface thereof the welded seam 22 is arranged circumferentially cross-wise to the rotational axis D of the shaft 8.

The bush 12 comprises a centre internal drilling hole 122 into which for mounting the shaft 8 with its tapered end is inserted from the rear side of the shaft in FIG. 11 and the adapter bolt 10 (see FIG. 1) is inserted from the other side. Via the welded seam 22 continuing in circumferential direction a firmly bonded connection is provided for a torque-proofed fixation of the shaft 8 and the adapter bolt 10 at the drilling hole 122 of the bush 12. The welded seam 22 can thereby for instance arranged such in the area of the bush 12, in which the shaft 8 and the adapter bolt 10 hit each other in the drilling hole 122, such that via the one welded seam 22 the shaft 8 as well as the adapter bolt 10 are firmly bonded to the bush 12. It is however also conceivable, to provide two separate welded seams 22, with which on one hand a firmly bonded connection between the bush 12 and the adapter bolt 10 is being obtained.

FIGS. 12A and 12B show further views of an embodiment of the bush 12 according to FIG. 11. As can be seen in FIG. 12B, the welded seam 22 describes a circumference angle α on the lateral surface of the cylindrical section 123 of the bush 12, which can be between 100° and 200°, preferably between 130° and 170°. The length of the welded seam 22 is thereby to be chosen by means of strength requirements of the connection between shaft 8, adapter bolt 10 and bush 12.

The moving direction B of a welding tool formed by a laser L is also shown in FIG. 12B, which is due to the arrangement of the welded seam 22 cross-wise to the rotational axis D of the shaft 8 also directed cross-wise to the rotational axis D.

Different advantages can be achieved due to the arrangement of the welded seam 22 cross-wise to the rotational axis D.

On the one hand, the geometry of the bush 12 can be simplified by providing the welded seam 22 cross-wise to the rotational axis D, since welded pockets (see FIG. 2) for fixing the welded seam can be omitted. Through this, the production of bush 12 is simplified, but also the production costs for the bush 12 are reduced.

Since no further welded pockets have to be provided, also the strength of the bush 12 and therefore the connection of the adapter bolt 10 and the shaft 8 to the door sided cam disc 6B is improved. By omitting the welded pockets a weakening of the cross-section of the bush 12 due to a sectional material thinning is avoided.

Secondly, the mounting process can be made easier by providing the welding seam 22 in cross direction, since the welded seam 22 can be mounted circumferentially in any desired angular position on the bush 12. For this reason an exact alignment of the bush 12 to the welding tool in circumferential direction is no longer required.

Thirdly, by arranging the welded seam 22 in cross direction the accessibility for a welding tool is remarkably improved, since the welded seam 22 can be attached with distance from locking fixture 200, in particular to the second fixture part 4B, and a moving of the welding tool in axial direction is not necessary. The production of the welded seam 22 can rather occur by a linear moving of the welding tool in cross direction.

Figure 6:
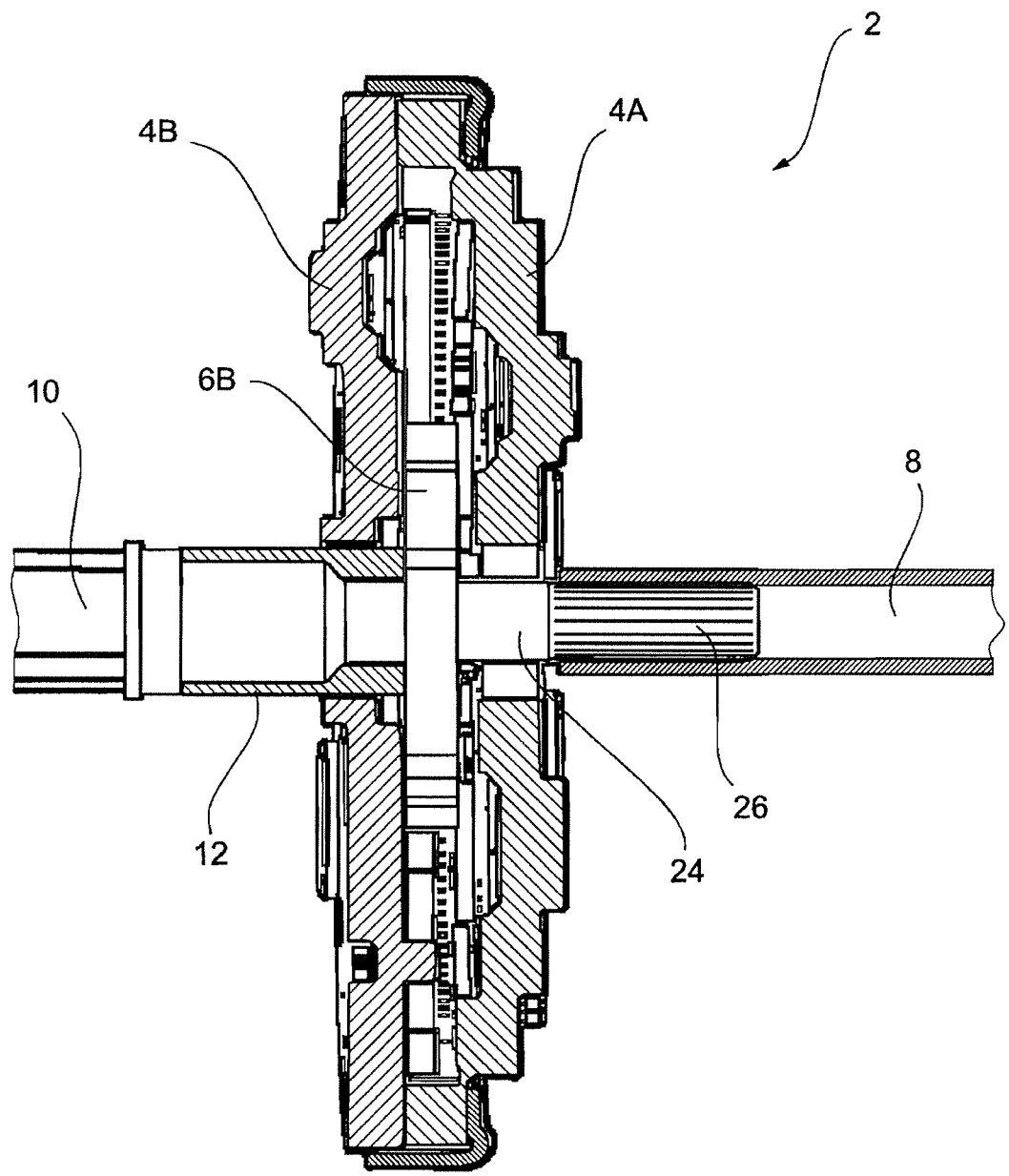
FIG. 6 shows a partially cut illustration of the door sided locking fixture according to a second embodiment.

In FIG. 6 a second embodiment for the door sided locking fixture 200 is shown. In this embodiment the adapter bolt 10 comprises a longitudinal pin 24, which is inserted through the complete bush 12. The cylindrical end of the longitudinal pin 24 comprises at the end side thereof a revolving knurling 26, which is formed by singular bars arranged in a distributive manner on the circumference and tapering preferably in the way of tooth. The front side end comprises a conical insertion slope.

The connection between the adapter bolt 10 and the bush 12 occurs via a welded joint as an embodiment of FIG. 5C.

When mounting the door sided locking fixture 2 shown in FIG. 6 in turn at first the bush 12 is in particular pressed-in to the cam disc 6B. Subsequently, the adapter bolt 10 is inserted through the bush 12 and is brought into the desired rotational position. Finally, the shaft 8 is pressed onto the longitudinal pin 24 from the tunnel side. Due to the knurling 26 thereof hereby also a positive connection effective in circumferential direction is formed. When pressing-in singular longitudinal bars of the knurling 26 are therefore formed into the internal surface of the hollow shaft 8.

A said embodiment of the door side looking fixture 2 in two different alternatives is now explained in more detail by means of the FIGS. 7A to C, 8A, 8B and 9.

In contrast to the previous embodiments the bush 12 is not pressed into the cavity 16 but rather solely inserted torque-proofed. In axial direction no firm connection between the bush 12 and the cam disc 6B is formed so that appearing axial forces are not transferred onto the cam disc 6B. In case of this embodiment, the bush 12 as well as the shaft 8 comprise a stop 28 formed as a revolving collar. The shaft 8 is in turn inserted into the bush 12. These two parts rest with these two stops 28 in each case against the two fixture parts 4A, 4B so that their axial position is determined. Subsequently, the adapter bolt 10 as well as the bush 12 is also inserted into the shaft 8. For this reason said adapter bolt comprises two pins 30A, 30B with different diameter following each other in axial direction. The front pin 30A with the smaller diameter is inserted into the shaft 8 while the back pin 308 with a larger diameter is inserted into the bush 12. The adapter bolt 10 is supported by the bush 12 with a collar 32. In the embodiment according to the FIGS. 7 and 8 the fixation of the rotational positions occurs by means of a firmly bonded connection by welding. In the FIGS. 8A, 8B different positions are hereby shown for possible welded seams 22. Said seams can be formed in the welded pockets 20 continuing in axial direction, revolving circular or interrupted, or also as singular welded dots. As deducible from FIG. 7C, a torque-proofed connection between the three parts can be obtained by a singular for instance circular revolving welded seam 22 in the area of the shaft 8 and the front pin 30A.

Alternatively to the welded joints a fixation by means of a simple press-in connection is provided according to FIG. 9. For this reason, the two pins 30A, 30B comprise in each case a revolving knurling 26, with which said pins form in each case a positive press-in connection with the internal sub wall of the bush 12 or the internal wall of the shaft 8.

In the FIGS. 10A, 10B finally an alternative embodiment for the arrangement of the external contour 13 as well as the corresponding internal contour of the cavity 16 is being shown. In this embodiment an essentially hexagonal polygonal structure is provided in contrast to the triangular polygonal structure according to FIGS. 3 and 4.

As in particular becomes apparent from the FIG. 10B the shaft 8 is widened by a reforming process on the tunnel sided end thereof, thus has a larger diameter than in the remaining area thereof. Through this the shaft 8 can be moved in each case during mounting from the tunnel side and can be moved until the opposite door sided locking fixture where the shaft 8 is either inserted with its cylindrical end into the bush 12 and/or is moved or pressed onto the pins 18, 24, 38.

Due to the fixture arrangement described here with the specific connection between the shaft 8 and the respective locking fixture 200, the following essential advantages are achieved:

- Due to the same part principle all locking fixtures 2 are identically formed, only in a last mounting step the position of a respective fixture is determined by the arrangement of the bush 12 and in particular by the adapter bolt 10;
- due to the free rotatability of the single parts towards each other in the intermediate mounting position on the door side a synchronical adjustment of the rotational position of the cam discs 6A, 6B is guaranteed;
- the adapter bolt 10 can be brought without problems in a desired rotational position due to the free movability in the intermediate mounting position.

Figure 13A:
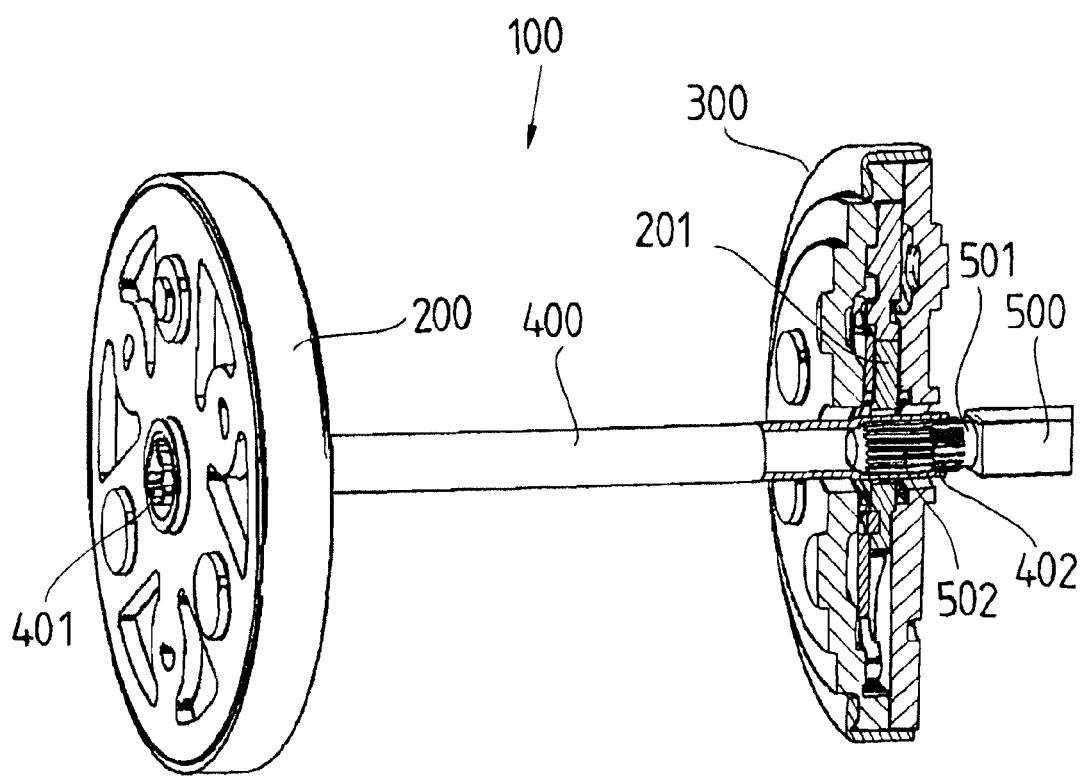
FIG. 13A shows a perspective sub-sectional view of a fixture arrangement.
Figure 13B:
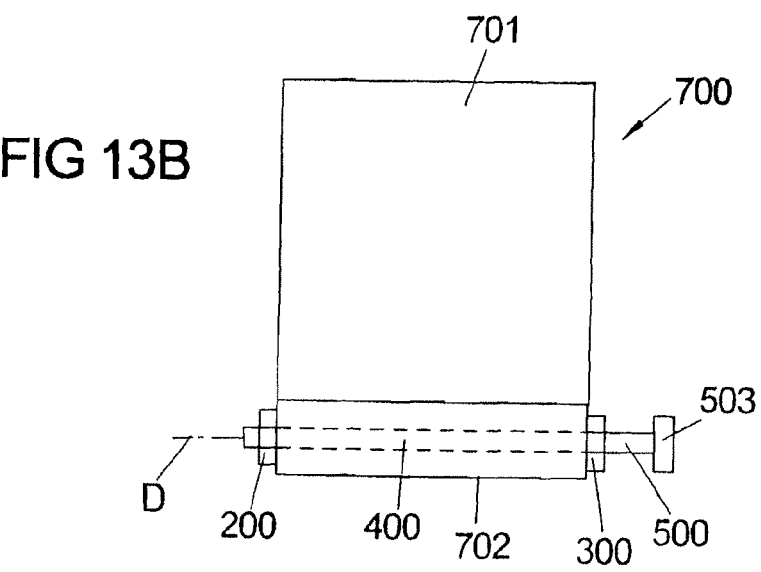
FIG. 13B shows a schematic view of a fixture arrangement on a vehicle seat.

FIG. 13A shows a further embodiment of a fixture arrangement 100 with a first locking fixture 200 and a second locking fixture 300, which are arranged on both sides of a vehicle seat 700 as shown in FIG. 13B. The fixture arrangement 100 can serve for instance for adjusting the inclination of a back rest 701, wherein the adjustment of the inclination of the backrest 701 locks the locking fixtures 200, 300 and therefore is arrested to a seat part 202 of the vehicle seat 700. The locking fixtures 200, 300 of the fixture arrangement 100 are connected towards each other via a shaft 400. The shaft 400 is operatively connected with a respective end 401, 402 with a driving element in form of a cam disc 201 of the locking fixture 200 and the locking fixture 300 and serves for actuating the cam discs 201 of the locking fixture 200 and the locking fixture 300 and therefore for actuating the fixture arrangement 100.

An embodiment of a locking fixture 200, 300 of the fixture arrangement 100 is shown in FIGS. 14A and 14B. The locking fixture 200, 300 comprises a first fixture part 202 and a second fixture part 203 which are connected with each other via an edge 204. The first fixture part 202 is for instance connected to the seating part 702 of a vehicle seat 700, and the second fixture part 203 is connected to the back rest 701 of the vehicle seat 700. The edge 204 encompasses the fixture part 203 and is connected torque-proofed to the fixture part 202 so that the fixture part 203 is rotatable in the edge 204 and therefore the back rest 701 is pivotable relatively to the sitting part 72.

The function of such locking fixtures 200, 300 is known as such. The guiding channels 226A, 226B, 226C indicated in FIG. 14A which are open towards the fixture part 203 locking elements 205A, 205B, 205C are guided at the fixture part 202. The guiding channels 226A, 226B, 226C are delimited sidewise by the guiding segments 227 which project from the fixture part 202 towards the fixture part 203 so that the locking elements 205A, 205B, 205C can only be moved in radial direction relatively to the fixture part 202. The driving element in form of a cam disc 201 is mounted around a rotational axis D pivotable towards the fixture part 202, wherein said driving element is pre-loaded via string elements 206A, 206B, 206C in direction of an arresting position. In this arresting position the cam disc 201 acts with its outer cams onto the locking elements 205A, 205B, 205C and presses these radial outwardly so that toothings 250 on the locking elements 205A, 205B, 205C are engaged with a toothing 230 on the fixture part 203. In this arresting position the position of the fixture part 202 is therefore arrested relative to the fixture part 203.

The cam disc 201 is twisted around the rotational axis D for actuating. As shown in FIG. 14B thereby a control disc 207 firmly connected with the cam disc 201 rotates together with the cam disc 201 around the rotational axis D, which acts via the control device 270A, 270B, 270C on gliding elements 251 arranged on the locking elements 205A, 205B, 205C.

Due to a twisted movement of the control disc 207 the control disc 207 pulls the locking elements 205a, 205b, 205c via the device sections 271, 272 of the control device 270a, 270b, 270c into a position radially shifted towards the rotational axis D so that the toothing 250 of the locking elements 205a, 205b, 205c are without engagement with the toothing 230 on the fixture part 203. In this non-arrested position the gliding elements 251 of the locking elements 205a, 205b, 205c are in the area of a device section 272 of the respectively corresponding control device 270a, 270b, 270c of the control disc 207.

In the non-arrested position the fixture part 202 and the fixture part 203 are pivotable relatively towards each other so that the backrest 701 can be pivoted relative to the seat part 702 of the vehicle seat 700 (see FIG. 13B). If the desired inclination position is achieved then the cam disc 201 automatically moves back into the arresting position due to the spring pre-load of the spring elements 206a, 206b, 206c, presses the locking elements 205a, 205b, 205c radially outwardly and arrests therefore the fixture part 202 in turn with the fixture part 203.

For actuating the cam disc 201 of each locking fixture 200, 300 the cam disc 201 of the locking fixtures 200, 300 are connected with each other via a shaft 400. The shaft 400 is thereby in the area of the locking fixture 300 connected via adapter bolt 500 (see FIG. 13) to an actuator lever 503 (see FIG. 13B) via which a user can actuate the fixture arrangement 100.

In the embodiment according to FIG. 13A the shaft 400 reaches through a cavity 210 of the cam disc 201, wherein the adapter bolt 500 engages with a pin 501 into an internal drilling hole of the shaft 400 directed along the rotational axis. The pin 501 has a fluting 502, which is pressed into the drilling hole of the shaft 400 for connecting the adapter bolt 500 with the shaft 400 and through this the shaft 400 is pressed with the cavity 210 of the cam disc 201.

In the following, the embodiment of the shaft 400 on the end 401 for connecting with the cam disc 201 of the locking fixture 200 shall be explained by the means of FIGS. 15 to 17.

Figure 16:
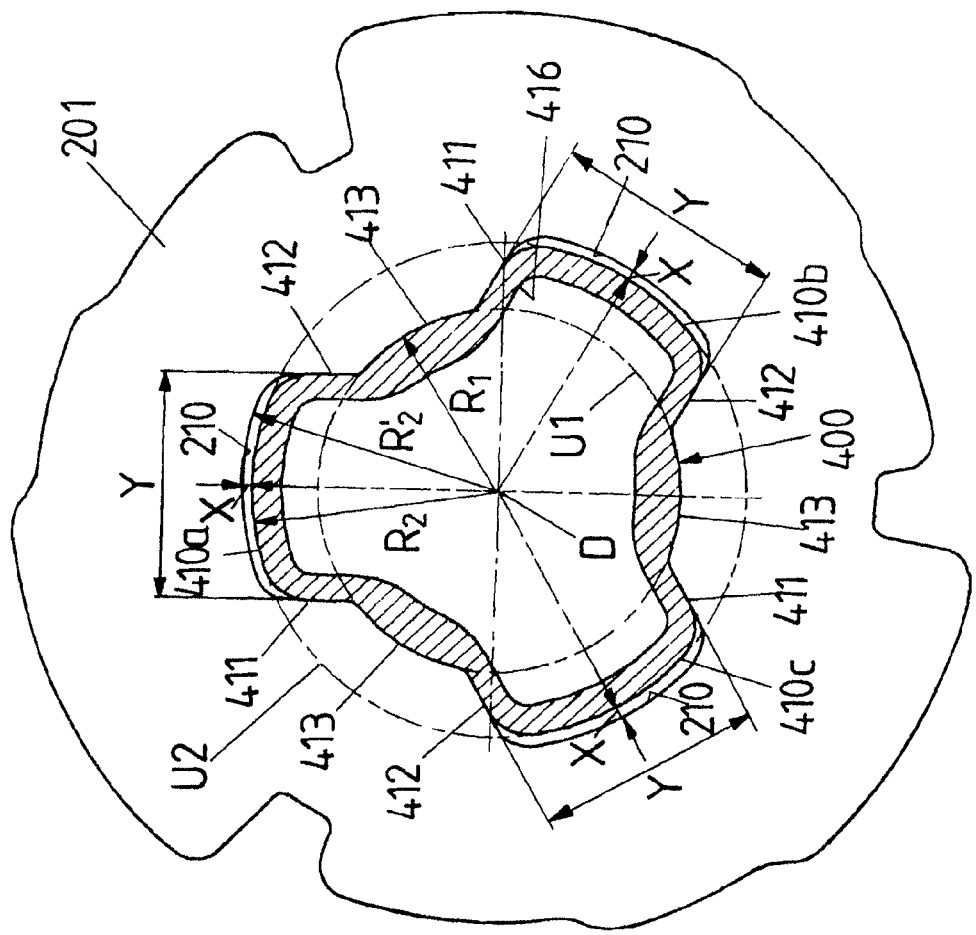
FIG. 16 shows a sub-sectional view of the end of a shaft according to FIG. 6 in a cavity of a driving element.
Figure 15:
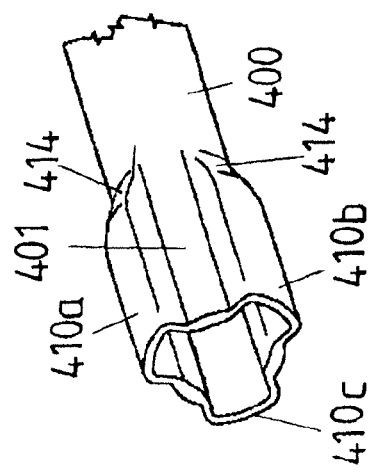
FIG. 15 shows a perspective view of an end of a shaft with projections.

FIG. 15 shows a perspective view of the end 401 of the shaft 400, FIG. 16 shows a cross-sectional view of the end 401 of the shaft 400 in the cam disc 201 of the locking fixture 200 and FIG. 17 shows a partially cut longitudinal view of the shaft 400.

The shaft 400 comprises in the area of the end 401 projections 410a, 410b, 410c which project as shown in FIG. 16 radially outwardly from a circumference C1 of the shaft 400. The projections 410a, 410b, 410c comprise thereby in each case two shoulders 411, 412 which are arranged towards each other in the distance Y and continue essentially parallel to each other. The shaft 400 comprises furthermore sections 413 which correspond to circular segments of a circle with radius R1 around the rotational axis D along the circumference U1.

The shaft 400 is inserted into a cavity 210 of the cam disc 201 of the locking fixture 200 for mounting. The shaft 400 is thereby operatively connected via the projections 410a, 410b, 410c with the cavity 210 of the cam disc 201, wherein the shaft 400 is not axially secured in the cam disc 201, so that the operative connection is only provided in the plane vertical to the rotational axis.

The shaft 400 is in contact via the shoulders 411 with the cavity 210 via the shoulders 411, 412 and the sections 413 for obtaining the operative connection. The shoulders 411, 412 on the one hand and the sections 413 on the other hand serve thereby different purposes.

An operative connection in circumferential direction of the shaft 400 for transmitting a turning moment from the shaft 400 via the cavity 210 onto the cam disc 201 is in particular provided via the shoulders 411, 412 of the projections 410a, 410b, 410c. Due to the parallel arrangement of the shoulders 411, 412 a preferred force transmission is provided, in which the wedge effect of the shaft 400 in the cavity 210 of the cam disc 201 is reduced by transmission of a turning moment.

Simultaneously, the contour formed by the projections 410a, 410b, 410c is obtainable in a simple manner by inserting a shaped profile part in direction of the rotational axis D into a central drilling hole 416 of the shaft 400 and the profile of the shaped profile part is imprinted by applying a pressure force onto the end 401 of the shaft 400. Due to the parallel arrangement of the shoulders 411, 412 undercuts in the internal contour of the drilling hole 416 are avoided so that a production by the means of cold forming is possible.

The parallel arrangement of the shoulders 411, 412 is a compromise between an optimal force transmission in circumferential direction on the one hand and an easy producibility of the shaft 400 on the other side. The shoulders 411, 412 have to be arranged as such radial to the rotational axis D for an optimal force transmission. In case of such a radial arrangement a mere turning moment can be transmitted by avoiding a radial force. In case of such a radial arrangement of the shoulders 411, 412, however, undercuts in the internal contour of the drilling hole 416 would occur so that a production by the means of cold forming would not be possible. Therefore, the shoulders 411, 412 are arranged parallel so that a cold forming is still possible and simultaneously a mere force transmission by a primarily transmission of a turning moment is achieved.

The projections 410a, 410b, 410c project outwardly from circumference U1. Since the shoulders 411, 412 project outwardly a preferred leverage is achieved which allows in comparison to forming of a profile from circumference C1 inwardly a larger force transmission by reduced applied load.

The sections 413 which are arranged along the circumference U1 in radius R1 of the rotational axis D serve the radial fixation and the centering of the shaft 400 in the cavity 210 of the cam disc 201. The sections 413 are operatively connected during inserting the shaft 400 into the cavity 210 with the cavity 210 and support the shaft radially relative to the cam disc 201.

As shown in FIG. 16 the projections 410a, 410b, 410c comprise in radial direction a distance X from the cavity 210 due to the external radius R2 of the projections 410a, 410, 410c being smaller in comparison to the radius R2' of the cavity 210, wherein the external contour rests on the circumference U2. Due to the distance X of the projections 410a, 410b, 410c from the cavity 210 it is achieved that while inserting the shaft 400 into the cavity 210 a centering occurs solely via the section 413 on the circumference U1, but not via the outer sections of the projections 410a, 410b, 410c present on the circumference U2. Through this, an over-determination is avoided for centering the shaft 400 in the cavity 210.

Basically it is also conceivable to form the external contour of the projections 410a, 410b, 410c positively with the cavity 210 and to provide a distance between the sections 413 and the cavity 210. The centering occurs then exclusively via the external contour of the projections 410a, 410b, 410c wherein again an over-determination is avoided.

FIG. 7 finally is a separate, partially cut view of the shaft 400. The shaft 400 comprises in the area of the projections 410a, 410b, 410c on the end 401 an insertion slope 414 and in direction of the rotational axis D a further insertion slope 415 shifted towards the end 402, which shall elevate the insertion of the shaft 400 into the cavity 210 of the cam disc 21 of the locking fixture 200, 300.

In the area of end 401 the shaft 400 is formed in a tapered manner. The shaft 400 is hollow inside and can be for instance formed as a steel pipe.

FIG. 18 is a further embodiment of a shaft 400 which differs from the embodiment of the shaft 400 according to FIG. 17 such that for forming the insertion slope 414 the projections 410a, 410b, 410c taper and therefore taper in circumferential direction towards the centre of the shaft 400 (in FIG. 18 the projections 410a, 410b, 410c taper towards the left). Through this it is achieved that the shaft 400 is twisted when inserting into the cavity 210 of the cam disc 201 of the locking fixture 200 (see FIG. 13A) automatically in a rotative manner such that the projections 410a, 410b, 410c can glide into the cavity 210 and a wedging of the shaft 400 with the cavity 210 during insertion is avoided.

As shown in FIG. 18 the insertion slopes are arranged along the rotational axis D in a distance Z in a shifted manner towards each other. The distance Z is thereby smaller than the distance of the two locking fixtures 200 and 300 towards each other. Through this it is achieved that when inserting the shaft 400 at first the insertion slope 414 contacts the cavity 210 of the cam disc 201 of the locking fixtures and only subsequently after the projections 410a, 410b, 410c are already disposed in the cavity 210 of the cam disc 201 of the locking fixture 200, the insertion slope 415 comes into the area of the cavity 210 of the cam disc 201 of the locking fixture 300.

The insertion slope 415 (shown on the left side in FIG. 18) is not completely inserted into the drilling hole of the bush but is only inserted as so far that a manufacturing tolerance in the accuracy of fit of the shaft 400 with the drilling hole is compensated (see FIG. 1). The insertion slope 415 serves therefore in particular also the centering of the shaft 400 in the drilling hole and the compensation of manufacturing tolerances.

The invention claimed is:

1. A fixture arrangement for a seat, in particular for a vehicle seat, comprising:
    a first fixture comprising a first driving element;
    a second fixture comprising a second driving element, the first driving element and the second driving element each comprising a cavity with an internal contour;
    an adjusting element for actuating the fixtures;
    a shaft connecting the two fixtures and the adjusting element;
    wherein the shaft has a first end with an external contour to be positively inserted into the first driving element and a second, in particular cylindrical end;
    wherein in an intermediate assembly state the second driving element, the second end of the shaft and the adjusting element are attachable to each other in an arbitrary rotational position;
    wherein a bush is provided between the shaft, the second driving element and the adjusting element so that in a final assembly state the second driving element, the shaft and the adjusting element are connected with each other in a rotationally fixed manner; and
    wherein the bush is in the cavity of the second driving element, wherein the bush is press-fitted or welded into the cavity of the second driving element, and wherein the adjusting element and the shaft are both in the bush and are connected with said bush by welding.

2. The fixture arrangement according to claim 1, wherein the adjusting element is designed as an adapter bolt for holding an actuator lever.

3. The fixture arrangement according to claim 1, wherein the adjusting element comprises a longitudinal pin, which is inserted through the bush and to which the shaft is fixed.

4. A fixture arrangement for a seat, in particular for a vehicle seat, comprising:
    a first fixture having a first driving element;
    a second fixture having a second driving element;
    a shaft connecting the first and the second fixture and extending along a rotational axis, the shaft comprising a first end connected with the first driving element in a positive fitting manner and a second end connected with the second driving element;
    an adjusting element for actuating the fixtures; and
    a bush connecting the second end of the shaft, the second driving element and the adjusting element with each other in a rotationally fixed manner and comprises furthermore a firmly bonded connection;
    wherein the second end of the shaft and the adjusting element are inserted into a hole of the bush and are connected to the bush by welding.

5. The fixture arrangement according to claim 4, wherein the firmly bonded connection is formed as a welded joint with a welded seam, wherein the welded seam is arranged crosswise to the rotational axis of the shaft at the bush or the weld is arranged in circumferential direction on a lateral surface of a cylindrical section of the bush and describes thereby a circumferential angle between 100° and 200°.

6. A method for assembling a fixture arrangement for a seat, in particular for a vehicle seat, wherein the fixture arrangement comprises:
    a first fixture comprising a first driving element;
    a second fixture comprising a second driving element, the first driving element and the second driving element each having a cavity with an internal contour;
    a shaft connecting the two fixtures; and
    an adjusting element for actuating the fixtures;
    wherein the shaft is inserted with a first end into the cavity of the first driving element in a positive locking manner;
    wherein on the second fixture the shaft, the second driving element and the adjusting element are brought into an intermediate assembly state, in which the second driving element, the shaft and the adjusting element are rotatable with respect to each other such that they are attachable to each other in an arbitrary rotational position;
    wherein subsequently the shaft, the second driving element and the adjusting element are connected to each other in a rotationally fixed manner in a desired rotational position;
    wherein for connecting the shaft, the second driving element and the adjusting element to each other a bush is in the cavity of the second driving element, wherein the bush is press-fitted or welded into the cavity of the second driving element and wherein the adjusting element and the shaft are both in the bush and are connected with said bush by welding.

7. A fixture arrangement for a seat, in particular for a vehicle seat, comprising:
    a first fixture comprising a first driving element;
    a second fixture comprising a second driving element, the first driving element and the second driving element each having a cavity with an internal contour;
    an adjusting element for actuating the fixtures;
    a shaft connecting the two fixtures and the adjusting element;
    wherein the shaft has a first end with an external contour to be positively inserted into the first driving element and a second, in particular cylindrical end;
    wherein in an intermediate assembly state the second driving element, the second end of the shaft and the adjusting element are attachable to each other in an arbitrary rotational position;
    wherein a fixation device for fixing the rotational position is provided between the shaft, the second driving element and the adjusting element so that in a final assembly state the second driving element, the shaft and the adjusting element are connected with each other in a rotationally fixed manner;
    wherein at the first end of the shaft at least one projection projecting radially with respect to a rotational axis from a first circumference of the shaft for obtaining a positive operative connection, the at least one projection comprising two shoulders which extend at least sectionally parallel to each other and are operatively connected with the first driving element.

8. The fixture arrangement according to claim 7, wherein the at least one projections on the first end of the shaft are obtained by cold forming of the shaft formed as a pipe.

9. The fixture arrangement according to claim 7, wherein the shaft comprises insertion slopes for inserting the shaft into the cavity of the first driving element.

10. A fixture arrangement for a seat, in particular for a vehicle seat, comprising:
- a first fixture having a first driving element;
- a second fixture having a second driving element;
- a shaft connecting the first and the second fixture and extending along a rotational axis, the shaft comprising a first end connected with the first driving element in a positive fitting manner and a second end connected with the second driving element;
- an adjusting element for actuating the fixtures; and
- a bush connecting the second end of the shaft, the second driving element and the adjusting element with each other in a rotationally fixed manner and comprises furthermore a firmly bonded connection;
- wherein the second end of the shaft and the adjusting element are inserted into a hole of the bush;
- wherein at the first end of the shaft at least one projection projecting radially with respect to the rotational axis from a first circumference of the shaft for obtaining a positive operative connection, the at least one projection comprising two shoulders which extend at least sectionally parallel to each other and are operatively connected with the first driving element.

11. The fixture arrangement according to claim 10, wherein the at least one projection on the first end of the shaft is obtained by cold forming of the shaft.

12. The fixture arrangement according to claim 10, wherein the shaft comprises insertion slopes for inserting the shaft into a cavity of the first driving element.

13. A method for assembling a fixture arrangement for a seat, in particular for a vehicle seat, wherein the fixture arrangement comprises:
- a first fixture comprising a first driving element;
- a second fixture comprising a second driving element, the first driving element and the second driving element each having a cavity with an internal contour;
- a shaft connecting the two fixtures; and
- an adjusting element for actuating the fixtures;
- wherein the shaft is inserted with a first end into the cavity of the first driving element in a positive locking manner;
- wherein on the second fixture the shaft, the second driving element and the adjusting element are brought into an intermediate assembly state in which the second driving element, the shaft and the adjusting element are rotatable with respect to each other such that they are attachable to each other in an arbitrary rotational position;
- wherein subsequently the shaft, the second driving element and the adjusting element are connected to each other in a rotationally fixed manner in a desired rotational position;
- wherein the shaft comprises at its first end at least one projection projecting radially with respect to the rotational axis from a first circumference of the shaft for engaging into a cavity of the first driving element of the first fixture, wherein the at least one projection comprises two shoulders which at least sectionally extend parallel to each other, wherein the shaft is inserted into the cavity of the first driving element of the first fixture such that the shoulders are operatively connected with the cavity of the first driving element, wherein in the intermediate assembly state the shaft is movable along the rotational axis relative to the first fixture and is rotatable around the rotational axis relative to the second fixture.

14. The method according to claim 13, wherein in a final assembly state the shaft is firmly bonded or positively connected with the second driving element of the second fixture.

* * * * *